(12) United States Patent
Suh et al.

(10) Patent No.: US 8,997,158 B2
(45) Date of Patent: *Mar. 31, 2015

(54) METHOD FOR PROCESSING TARGETING DESCRIPTOR IN NON-REAL-TIME RECEIVER

(75) Inventors: Jong Yeul Suh, Seoul (KR); Kwan Suk Kim, Seoul (KR); Gomer Thomas, Arlington, WA (US); Jae Hyung Song, Seoul (KR); Jin Pil Kim, Seoul (KR); Ho Taek Hong, Seoul (KR); Joon Hui Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 575 days.

This patent is subject to a terminal disclaimer.

(21) Appl. No.: 13/418,952

(22) Filed: Mar. 13, 2012

(65) Prior Publication Data

US 2012/0180091 A1 Jul. 12, 2012

Related U.S. Application Data

(63) Continuation of application No. 12/654,075, filed on Dec. 9, 2009, now Pat. No. 8,161,512.

(60) Provisional application No. 61/257,808, filed on Nov. 3, 2009, provisional application No. 61/138,494, filed (Continued)

(51) Int. Cl.
  *H04N 7/20* (2006.01)
  *H04N 21/434* (2011.01)
  *H04N 21/45* (2011.01)
  *H04N 21/454* (2011.01)

(52) U.S. Cl.
  CPC ....... *H04N 21/4345* (2013.01); *H04N 21/4508* (2013.01); *H04N 21/454* (2013.01)

USPC ........ 725/71; 725/9; 725/17; 725/20; 725/25; 725/35; 725/67; 725/68; 725/70; 725/93; 725/116; 725/146; 370/312; 370/432; 709/217; 709/227; 709/229; 348/731; 348/426.1; 348/384.1

(58) Field of Classification Search
  CPC .......... H04N 21/4345; H04N 21/4508; H04N 21/454
  USPC ............. 725/9, 17, 20, 25, 35, 67–68, 70–71, 725/93, 116, 146
  See application file for complete search history.

(56) References Cited

U.S. PATENT DOCUMENTS

| | | |
|---|---|---|
| 2005/0166244 A1 | 7/2005 | Moon |
| 2007/0283408 A1 | 12/2007 | Lee |
| 2009/0025051 A1 | 1/2009 | Hong et al. |
| 2010/0075591 A1 | 3/2010 | Eyer et al. |

(Continued)

*Primary Examiner* — Jason Salce
(74) *Attorney, Agent, or Firm* — McKenna Long & Aldridge LLP

(57) ABSTRACT

A method of receiving a broadcast signal including a Non-Real-Time (NRT) Receiver Targeting service is disclosed herein. A method of receiving a broadcast signal including a Non-Real-Time (NRT) Receiver Targeting service, the method comprises receiving broadcast signal including first signaling information and second signaling information, identifying an NRT service based on the first signaling information, parsing a Receiver Targeting Descriptor from the second signaling information, determining validity of the NRT service or an NRT content based on a targeting_criterion_type_code included in the Receiver Targeting Descriptor, and downloading the NRT service or the NRT content when a receiver determines the NRT service or the NRT content to be valid.

10 Claims, 28 Drawing Sheets

Related U.S. Application Data on Dec. 17, 2008, provisional application No. 61/121,178, filed on Dec. 9, 2008, provisional application No. 61/121,181, filed on Dec. 9, 2008, provisional application No. 61/153,973, filed on Feb. 20, 2009, provisional application No. 61/153,985, filed on Feb. 20, 2009, provisional application No. 61/226,259, filed on Jul. 16, 2009.

(56) References Cited

U.S. PATENT DOCUMENTS

| | | |
|---|---|---|
| 2010/0134701 A1 | 6/2010 | Eyer |
| 2010/0309387 A1 | 12/2010 | Eyer |
| 2011/0001885 A1 | 1/2011 | Eyer |
| 2011/0004908 A1 | 1/2011 | Eyer |
| 2011/0004910 A1 | 1/2011 | Eyer |

FIG. 4

| Syntax | No. of Bits | Format |
|---|---|---|
| virtual_channel_table_section(){ | | |
|   table_id | 8 | 0xC8 |
|   section_syntax_indicator | 1 | '1' |
|   Private_indicator | 1 | '1' |
|   reserved | 2 | '11' |
|   section_length | 12 | uimsbf |
|   transport_stream_id | 16 | 010x0000 |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for(i=0;i<num_channels_in_section;i++){ | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for(i=0;i<N;i++){ | | |
|       descriptor() | | |
|     } | | |
|   } | | |
|   reserved | 6 | '111111' |
|   additional_descriptors_length | 10 | uimsbf |
|   for(j=0;j<N;j++){ | | |
|     additional_descriptor() | | |
|   } | | |
|   CRC_32 | 32 | rpchof |
| } | | |

FIG. 5

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

FIG. 6

| Value | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional data) conforming to ATSC standards |
| 0x03 | ATSC_audio - The virtual channel carries audio programming (audio service and optional data) conforming to ATSC standards |
| 0x04 | ATSC_data_only_service - The virtual channel carries a data service conforming to ATSC standards, but no video of stream_type 0x02 or audio of stream_type 0x81 |
| 0x05 | Software Download Data Service – see A/97 |
| 0x06 | Unassociated/small screen service – see A/65C Amendment 1 |
| 0x07 | Parameterized Service – New A/V CODEC |
| 0x08 | ATSC_nrt_service — The virtual channel carries a NRT service conforming to ATSC standards |
| 0x09-0x7F | [ Reserved for future ] |
| 0x80-0xFF | [ User Private ] |

FIG. 7

| Syntax | No. of Bits | Format |
|---|---|---|
| data_service_table_bytes() { | | |
|    sdf_protocol_version | 8 | uimsbf |
|    application_count_in_section | 8 | uimsbf |
|    if(application_coumt_in_section >0) { | | |
|      for(j=0;j <application_count_in_section;j++) { | | |
|        compatibility_descriptor() | | |
|        app_id_byte_length | 16 | uimsbf |
|        if(app_id_byte_length>1) { | | |
|          app_id_description | 16 | uimsbf |
|          for(i=0; i<app_id_byte_length> 1){ | | |
|            app_id_byte | 8 | bslbf |
|          { | | |
|        } | | |
|        tap_count | 8 | uimsbf |
|        for(i=0;i<tap_count;i++){ | | |
|          protocol_encapsulation | 8 | uimsbf |
|          action_type | 7 | uimsbf |
|          resourec_location | 1 | bslbf |
|          Tap() | | |
|          Tap_info_length | 16 | uimsbf |
|          for(k=0; k<N; k++) { | | |
|            descriptor() | | |
|          } | | |
|        } | | |
|        app_info_length | 16 | uimsbf |
|        for(i=0; i<M;i++) { | | |
|          app_data_byte | | |
|        } | | |
|        app_data_length | 16 | uimsbf |
|        for(i=0; i<app+data_lingth; i++) { | | |
|          app_data_byte | 8 | bslbf |
|        } | | |
|      } | | |
|    } | | |
|    service_info_lingth | 16 | uimsbf |
|    for(j=0; j<K; j++) { | | |
|      descriptor() | | |
|    } | | |
|    service_private_data_length | 16 | uimsbf |
|    for(j=0; j<service_private_data_length; j++) { | | |
|      service_privata_data_byte | 8 | bslbf |
|    } | | |
| } | | |

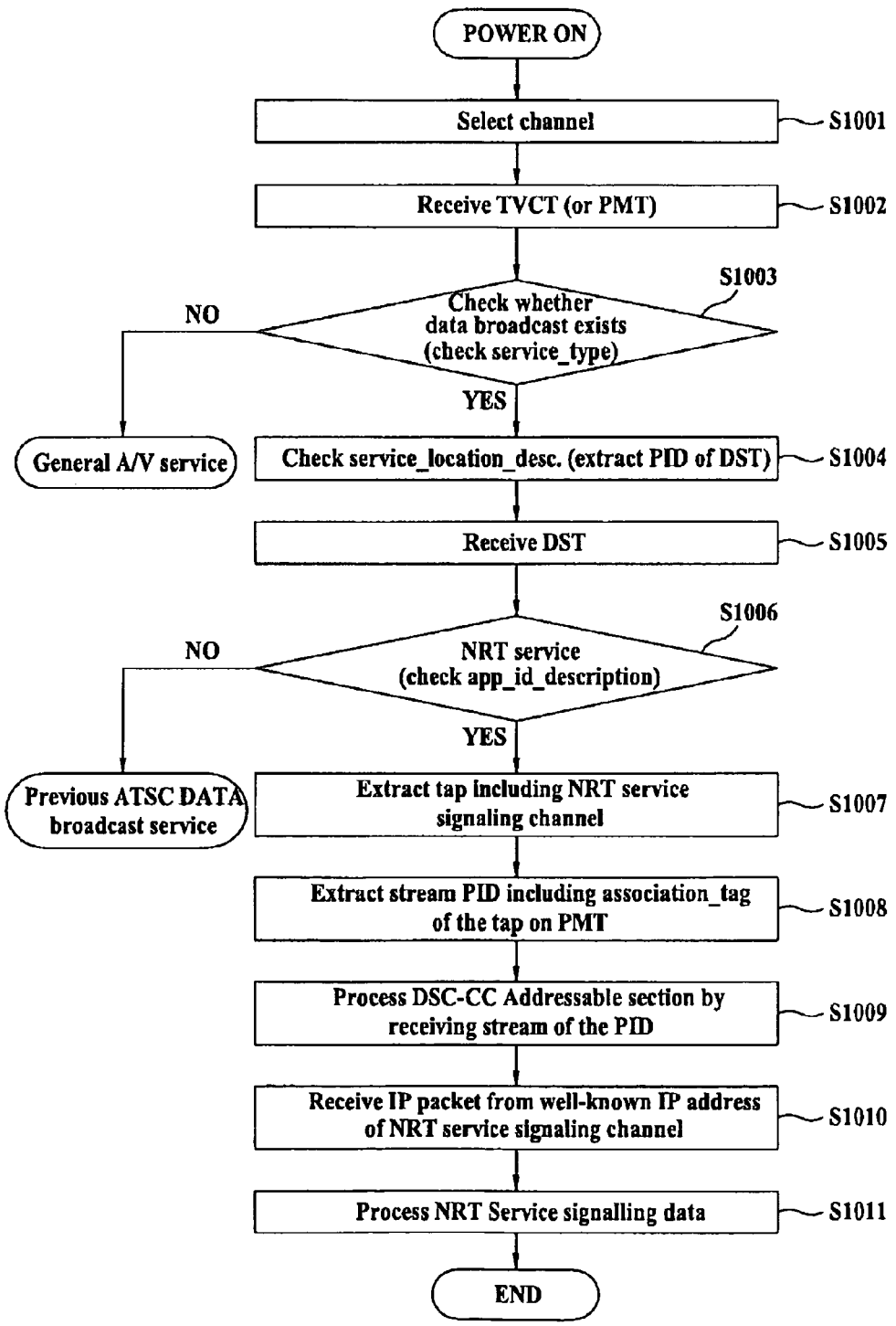

FIG. 10

| Syntax | No. of Bits | Format |
|---|---|---|
| NRT_service_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     NST_protocol_version | 8 | uimsbf |
|     reserved | 8 | '11111111' |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_NRT_services | 8 | uimsbf |
|   for (j=0;j< num_NRT_services; j++) | | |
|   { | | |
|     NRT_service_id | 16 | uimsbf |
|     reserved | 2 | '11' |
|     NRT_service_status | 2 | uimsbf |
|     SP_indicator | 1 | bslbf |
|     short_NRT_service_name_length /* m */ | 3 | uimsbf |
|     short_NRT_service_name | 16*m | |
|     reserved | 2 | '11' |
|     NRT_service_category | 6 | uimsbf |
|     num_components | 5 | uimsbf |
|     IP_version_flag | 1 | bslbf |
|     source_IP_address_flag | 1 | bslbf |
|     NRT_service_destination_IP_address_flag | 1 | bslbf |
|     if (source_IP_address_flag) | | |
|       source_IP_address | 32 or 128 | uimsbf |
|     if (NRT_service_destination_IP_address_flag) | | |
|       NRT_service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | 32 or 128 | uimsbf |
|         component_destination_IP_address | 4 | '1111' |
|       reserved | | |

FIG. 11

| | | |
|---|---|---|
| num_component_level_descriptors | 4 | uimsbf |
| for (k=0;k< num_components_level_descriptors; k++) { | | |
|     component_level_descriptor() | var | |
|   } | | |
| } | | |
| reserved | 4 | '1111' |
| num_NRT_service_level_descriptors | 4 | uimsbf |
| for (m=0; m<num_NRT_service_level_descriptors; m++) { | | |
|     NRT_service_level_descriptor() | var | |
|   } | | |
| } | | |
| reserved | 4 | '1111' |
| num_virtual_channel_level_descriptors | 4 | uimsbf |
| for (n=0; n<num_virtual_channel_level_descriptors; n++) { | | |
|   { | | |
|     virtual_channel_level_descriptor() | var | |
|   } | | |
| } | | |

FIG. 12

| Syntax | No.of Bits | Format |
|---|---|---|
| NRT_component_descriptor() { | | |
|     descriptor_tag | 8 | 0 x CB |
|     descriptor_length | 8 | uimsbf |
|     component_type | 7 | uimsbf |
|     component_encryption_flag | 1 | |
|     if(component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     NRT_component_data(component_type) | var | |
| } | | |

FIG. 13

| Syntax | No.of Bits | Format |
|---|---|---|
| NRT_FLUTE_component_data(){ | | |
|    TSI | 16 | uimsbf |
|    session_start_time | 32 | uimsbf |
|    session_end_time | 32 | uimsbf |
|    reserved | 5 | '11111' |
|    tias_bandwidth_indicator | 1 | bslbf |
|    as_bandwidth_indicator | 1 | bslbf |
|    FEC_OTI_indicator | 1 | bslbf |
|    if (tias_bandwidth_indicator == '1') { | | |
|       tias_bandwidth | 16 | uimsbf |
|    } | | |
|    if (as_bandwidth_indicator == '1') { | | |
|       as_bandwidth | 16 | uimsbf |
|    } | | |
|    if (FEC_OTI_indicator == '1') { | | |
|       FEC_encoding_id | 8 | uimsbf |
|       FEC_instance_id | 16 | uimsbf |
|    } | | |
| } | | |

FIG. 14

| Syntax | No.of Bits | Format |
|---|---|---|
| NRT_information_table_section() { | | |
|   table_id | 8 | 0xTBD |
|   section_syntax_indicator | 1 | '1' |
|   private_indicator | 1 | '1' |
|   reserved | 2 | '11' |
|   section_length | 12 | uimsbf |
|   service_id | 16 | uimsbf |
|   reserved | 2 | '11' |
|   NRT_IT_version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   time_span_start | 32 | uimsbf |
|   reserved | 5 | '11111' |
|   time_span_length | 11 | uimsbf |
|   num_items_in_section | 8 | uimsbf |
|   for(j=0; j<num_items_in_section; j++) { | | |
|     content_linkage | 32 | uimsbf |
|     updates_available | 1 | bslbf |
|     reserved | 1 | '1' |
|     TF_available | 1 | bslbf |
|     low_latency | 1 | bslbf |
|     playback_length_in_seconds | 20 | uimsbf |
|     content_length_included | 1 | bslbf |
|     playback_delay_included | 1 | bslbf |
|     expiration_included | 1 | bslbf |
|     reserved | 1 | '1' |
|     duration | 12 | uimsbf |

FIG. 15

| | | |
|---|---|---|
| `if(content_length_included=1) {`<br>    `content_length`<br>`}`<br>`if(playback_delay_included=1) {`<br>    `reserved`<br>    `playback_delay`<br>`}`<br>`if(expiration_included=1) {`<br>    `expiration`<br>`}`<br>`content_name_lingth`<br>`content_name_text()`<br>`reserved`<br>`content_descriptors_length`<br>`for(i=-;i<N; i++) {`<br>    `content_descriptor()`<br>    `}`<br>`}`<br>`reserved`<br>`descriptors_length`<br>`for(i=0; i<M; i++) {`<br>    `descriptor()`<br>    `}`<br>`}` | 40<br><br><br><br>4<br>20<br><br><br><br>32<br>8<br>var<br>4<br>12<br><br><br><br><br>6<br>10 | uimsbf<br><br><br><br>'1111'<br>uimsbf<br><br><br><br>uimsbf<br>uimsbf<br><br>'1111'<br>uimsbf<br><br><br><br><br>'111111'<br>uimsbf |

FIG. 16

| Syntax | No. of Bits | Format |
|---|---|---|
| receiver_targeting_descriptor() { | | |
| descriptor_tag | 8 | 0xTBD |
| descriptor_length | 8 | uimsbf |
| num_targeting_entries | 8 | uimsbf |
| for (i=0; i<num_targeting_entries; i++) { | | |
| targeting_criterion_type_code | 5 | uimsbf |
| targeting_value_length_minus_1 | 3 | uimsbf |
| targeting_value | var | var |
| } | | |
| } | | |

FIG. 17

| targeting_criterion_type_code | targeting_value_length | targeting_value |
|---|---|---|
| 0x00 | N/A | Reserved |
| 0x01 | 3 bytes | Geographical location as defined in Table 6.21 of A/65C, using only the low order 3 bytes. |
| 0x02 | var | Alphanumeric postal code as defined in section 6.7.2 of A/65C, using the number of bytes appropriate to the region (up to 8). |
| 0x03 | 2 bytes | Demographic category as defined in Table 6.18 of A/65C, using only the low order 2 bytes. |
| 0x04 – 0x0F | N/A | Reserved for future ATSC use |
| 0x10 – 0x1F | N/A | Available for private use |

FIG. 18

| Conditional Type Value Format |||
|---|---|---|
| Syntax | No.of Bits | Format |
| dcc_selection_id { | | |
| reserveed | 40 | 0xFFFFFFFFFF |
| location_code { | | |
| state_code | 8 | uimsbf range 0..99 |
| county_subdivision | 4 | uimsbf range 0..9 |
| reserved | 2 | '11' |
| county_code | 10 | uimsbf rang 0..999 |
| } | | |
| } | | |

FIG. 19

| Value | Meaning |
|---|---|
| 0x0000000000000001 | Males |
| 0x0000000000000002 | Females |
| 0x0000000000000004 | Ages 2-5 |
| 0x0000000000000008 | Ages 6-11 |
| 0x0000000000000010 | Ages 12-17 |
| 0x0000000000000020 | Ages 18-34 |
| 0x0000000000000040 | Ages 35-49 |
| 0x0000000000000080 | Ages 50-54 |
| 0x0000000000000100 | Ages 55-64 |
| 0x0000000000000200 | Ages 65+ |
| 0x0000000000000400 | Working |
| 0x0000000000000800 - 0x8000000000000000 | Reserved |

FIG. 20

| Syntax | No. of Bits | Format |
|---|---|---|
| targeting_criterion_table_section() { | | |
| table_id | 8 | 0xTBD |
| section_syntax_indicator | 1 | '0' |
| private_indicator | 1 | '1' |
| reserved | 2 | '11' |
| section_length | 8 | uimsbf |
| table_id_extension { | | |
|     TCT_protocol_version | 8 | uimsbf |
|     targeting_criterion_type_code | 5 | uimsbf |
|     targeting_value_length_minus_1 | 3 | uimsbf |
| } | | |
| reserved | 2 | '11' |
| version_number | 5 | uimsbf |
| current_next_indicator | 1 | '1' |
| section_number | 8 | uimsbf |
| last_section_number | 8 | uimsbf |
| criterion_type_text_length | 8 | uimsbf |
| criterion_type_text() | var | |
| num_values | 8 | |
|   for (i=0; i<num_values; i++) { | | |
|     value_code | 8*(N+1), where N = targeting_value_length_minus_1 | uimsbf |
|   value_text_length | 8 | uimsbf |
|   value_text() | var | string |
|   } | | |
| } | | |

FIG. 22

```
<xs:complexType name="TargetCrierionType">
    <xs:sequence>
        <xs:element name="CriterionValue" maxOccurs="unbounded">
            <xs:simpleType>
                <xs:restriction base="xs:hexBinaty">
                    <xs:maxLength value="64"/>
                <xs:restriction>
            </xs:simpleType>
        </xs:element>
    </xs:sequence>
    <xs:attribute name="Criteriontype" type="xs:unsignedByte" use="required"/>
</xs:complexType>
```

FIG. 23

XML Schema Definition for RcvrTargetingType

```xml
<xml version="1.0" encoding="UTF-8">
<schema xmlns="http://www.w3.org/2001/XMLSchema">
<complexType name="RcvrTargetingType">
<sequence>
<element name ="GeoLoc" minOccurs="0" maxOccurs="unbounded">
<complexType>
<attribute name="stateFIPS" >
<simpleType>
<restriction base="unsignedByte">
<maxInclusive value="99"/>
</restriction>
</simpleType>
</attribute>
<attribute name="countyFIPS" >
<simpleType>
<restriction base="unsignedShort">
<maxInclusive value="999"/>
</restriction>
</simpleType>
</attribute>
<attribute name="coSubDiv" >
<simpleType>
<restriction base="unsignedByte">
<maxInclusive value="99"/>
</restriction>
</simpleType>
</attribute>
</complexType>
</element>
<element name="PostCode" minOccurs="0" maxOccurs="unbounded">
<simpleType>
<restriction base="string">
<maxLength value="8"/>
</restriction>
</simpleType
```

FIG. 24

```
</element>
<element name="PostCode" minOccurs="0" maxOccurs="unbounded">
<simpleType>
<restriction base="string">
<maxLength value="8"/>
</restriction>
</simpleType>
</element>
<element name="DemoCat" minOccurs="0" maxOccurs="unbounded">
<simpleType>
<restriction base="hexBinary">
<maxLength value="2"/>
</restriction>
</simpleType>
</element>
<element name="Other" minOccurs="0" maxOccurs="unbounded">
<complexType>
<attribute name="criterion">
<simpleType>
<restriction base="unsignedByte">
<maxInclusive value="31"></maxInclusive>
</restriction>
</simpleType>
</attribute>
<attribute name="value">
<simpleType>
<restriction base="hexBinary">
<maxLength value="8"/>
</restriction>
</simpleType>
</attribute>
</complexType>
</element>
</sequence>
</complexType>
</schema>
```

FIG. 27

| Content |
|---|
| id |
| version |
| validFrom |
| validTo |
| globalContentID |
| baseCID |
| ServiceReference |
|     idRef |
|     weight |
| Name |
| Description |
| StartTime |
| EndTime |
| AudioLanguage |
|     languageSDPTag |
| TextLanguage |
|     languageSDPTag |
| Length |
| ParentalRating |
|     ratingSystem |
|     ratingValueName |
| Genre |
| Extension |
|     url |
|     Description |
| PreviewDataReference |
|     idRef |
|     usage |
| PrivateExt |
|     UpdatesAvailable |
|     ContentEncoding |
|     ConentLinkage |
|     ContentType |
|     DescriptiveTags |
|     RequiredStorage |
|     ReceiverTargeting |

US 8,997,158 B2

METHOD FOR PROCESSING TARGETING DESCRIPTOR IN NON-REAL-TIME RECEIVER

This application is a Continuation of application Ser. No. 12/654,075, filed on Dec. 9, 2009 now U.S. Pat. No. 8,161,512 and claims the benefit of U.S. Provisional Application No. 61/257,808, filed on Nov. 3, 2009, which is hereby incorporated by reference. This application also claims the benefit of U.S. Provisional Application No. 61/138,494, filed on Dec. 17, 2008, which is hereby incorporated by reference. This application also claims the benefit of U.S. Provisional Application No. 61/121,178, filed on Dec. 9, 2008, which is hereby incorporated by reference. This application also claims the benefit of U.S. Provisional Application No. 61/121,181, filed on Dec. 9, 2008, which is hereby incorporated by reference. This application also claims the benefit of U.S. Provisional Application No. 61/153,973, filed on Feb. 20, 2009, which is hereby incorporated by reference. This application also claims the benefit of U.S. Provisional Application No. 61/153,985, filed on Feb. 20, 2009, which is hereby incorporated by reference. This application also claims the benefit of U.S. Provisional Application No. 61/226,259, filed on Jul. 16, 2009, which is hereby incorporated by reference.

BACKGROUND OF THE INVENTION

1. Field of the Invention

The present invention relates to a method of receiver targeting mechanism based on the optional association of targeting criteria with services or individual content items. In the case of fixed broadcasts, the targeting criteria are contained in a Receiver Targeting descriptor that can go in the descriptor loop of a service in the Non-Real-Time Service Table (NST) or in the descriptor loop of a content item in the Non-Real-Time Information Table (NRT-IT). In the case of mobile broadcasts, the targeting criteria are contained in a Receiver Targeting XML element that can go in the PrivateExt element of a Service fragment or Content Fragment of the Service Guide or in the Service Map Table (SMT).

2. Discussion of the Related Art

A Non-Real-Time (NRT) service is one of the most powerful applications that will be utilized for future Digital Television (DTV) services. The NRT is accompanied by a non-real-time transmission (not real-time streaming), storage, and viewing operations. The NRT transmits a content of a file type on a surplus bandwidth via a broadcast medium such as terrestrial and the like. And, it is expected that the NRT will be implemented in various kinds of service functions including push VOD, targeted advertising and the like.

SUMMARY OF THE INVENTION

An object of the present invention is to provide a method of receiving a broadcast signal including a Non-Real-Time (NRT) Receiver Targeting service, wherein receiving a broadcast signal including first signaling information and second signaling information, identifying an NRT service based on the first signaling information, parsing a Receiver Targeting Descriptor from the second signaling information, determining validity of the NRT service or an NRT content based on a targeting_criterion_type_code included in the Receiver Targeting Descriptor, and downloading the NRT service or the NRT content when a receiver determines the NRT service or the NRT content to be valid.

Another object of the present invention is to provide a broadcast receiver for receiving a broadcast signal including a Non-Real-Time (NRT) Receiver Targeting service, wherein, a baseband processor for receiving a broadcast signal including first signaling information and second signaling information, a Program Specific Information/Program and System Information Protocol (PSI/PSIP) section parser for identifying an NRT service based on the first signaling information, a Service Signaling Section Parser for parsing a Receiver Targeting Descriptor from the second signaling information, a Service Manager for determining validity of the NRT service or an NRT content based on a targeting_criterion_type_code included in the Receiver Targeting Descriptor, and an NRT service manager for downloading the NRT service or the NRT content when the receiver determines the NRT service or the NRT content to be valid.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 4 is a diagram for a bit-stream section of a Terrestrial Virtual Channel Table (TVCT) section configured according to an embodiment of the present invention;

FIG. 5 is an exemplary diagram of an Advanced Television Systems Committee (ATSC) service type field value and the meaning according to FIG. 4 and the present invention;

FIG. 6 is another exemplary diagram of an ATSC service type field value and the meaning according to FIG. 4 and the present invention;

FIG. 7 is a diagram for a bit-stream syntax of a Data Service Table (DST) section to identify an NRT application configured according to an embodiment of the present;

FIG. 9 is a flowchart illustrating FIG. 8;

FIGS. 10 and 11 are diagrams for a bit-stream syntax of Non-Real-Time Service Table (NST) extracted by a receiver from a received MPEG-2 TS configured according to an embodiment of the present invention;

FIG. 12 is a diagram of a bit-stream syntax of a component_descriptor( ) configured according to an embodiment of the present invention;

FIG. 13 is a diagram of a bit-stream syntax of an NRT_FLUTE_component_data( ) configured according to an embodiment of the present invention;

FIGS. 14 and 15 are diagrams of a bit-stream syntax of a Non-Real-Time Information Table (NRT-IT) configured according to an embodiment of the present invention;

FIG. 16 is a diagram for a bit-stream syntax for the Receiver Targeting Descriptor configured according to an embodiment of the present invention;

FIG. 17 is a diagram illustrating the Target Criterion Type Codes configured according to an embodiment of the present invention;

FIG. 18 is a diagram of Conditional Type Value Format according to targeting_value in FIG. 17 and according to an embodiment of the present invention;

FIG. 19 is a diagram of Demographic Selection Type Assignments according to targeting_value in FIG. 17 and according to an embodiment of the present invention;

FIG. 20 is a diagram of a bit-stream syntax for the Targeting Criterion Table configured according to an embodiment of the present invention;

FIG. 22 is a XML Schema Definition for Receiver Targeting Type according to an embodiment of the present invention;

FIGS. 23 and 24 is a XML Schema Definition for Receiver Targeting Type according to another embodiment of the present invention;

FIG. 27 is a block diagram of a mobile NRT Service receiving system according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Terminologies used for the present invention are selected from general terminologies, which are currently and widely used, in consideration of the functions in the present invention but may vary according to intentions of a person having an ordinary knowledge in the technical field, practices or the advent of new technology, etc. In specific case, a terminology may be arbitrarily chosen by the applicant(s). In such case, its detailed meaning shall be described in the Detailed Description of the Invention. Therefore, the terminology used for the present invention needs to be defined based on the intrinsic meaning of the terminology and the contents across the present invention instead of a simple name of the terminology.

Figure 1:
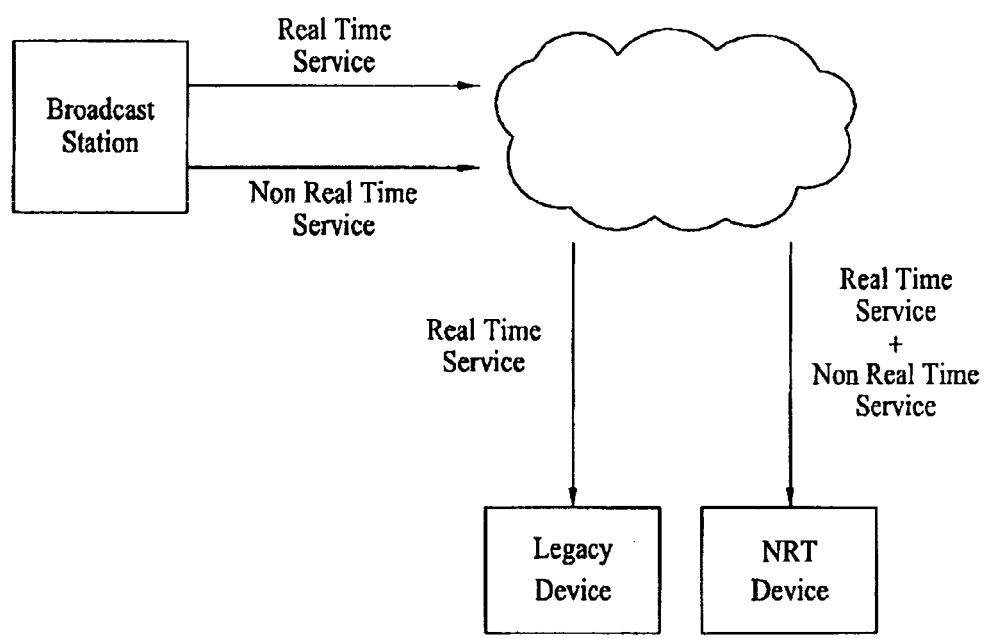
FIG. 1 is an exemplary conceptual diagram of Real-Time (RT) Service and a Non-Real-Time (NRT) service.

FIG. 1. is an exemplary conceptual diagram of an NRT service.

A broadcasting station transmits a real-time (hereinafter abbreviated RT) service according to a conventional method. In doing so, the broadcasting station transmits the RT service or the Non-Real-Time (NRT) service using a bandwidth left in the due course. In such case, the NRT service can contain a movie, news clip, weather information, advertisements, and contents for Push Video on Demand (VOD), and the like.

A legacy device has the principle that the operation is not affected by an NRT stream included within a channel. However, a DTV receiver, a related art, has a problem in receiving and processing the NRT service provided by a broadcasting station properly because of not having a means for processing unit for the NRT service.

On the contrary, a broadcast receiver according to the present invention, i.e., an NRT device is able to properly receive and process an NRT service combined with an RT service, thereby providing a viewer with more various functions than those of the related art DTV.

In this case, the RT service and the NRT service are transmitted on the same DTV channel or different DTV channels and are transmitted through an MPEG-2 transport packet (TP) or an internet protocol (IP) datagram. Hence, a receiver needs to identify the two kinds of services transmitted on the same or different channel. A method of defining and providing signaling information to enable a receiver to receive and process an NRT service is described. The broadcasting station provides signaling information of at least one unique packet identifier (PID) for identifying an NRT service.

Figure 2:
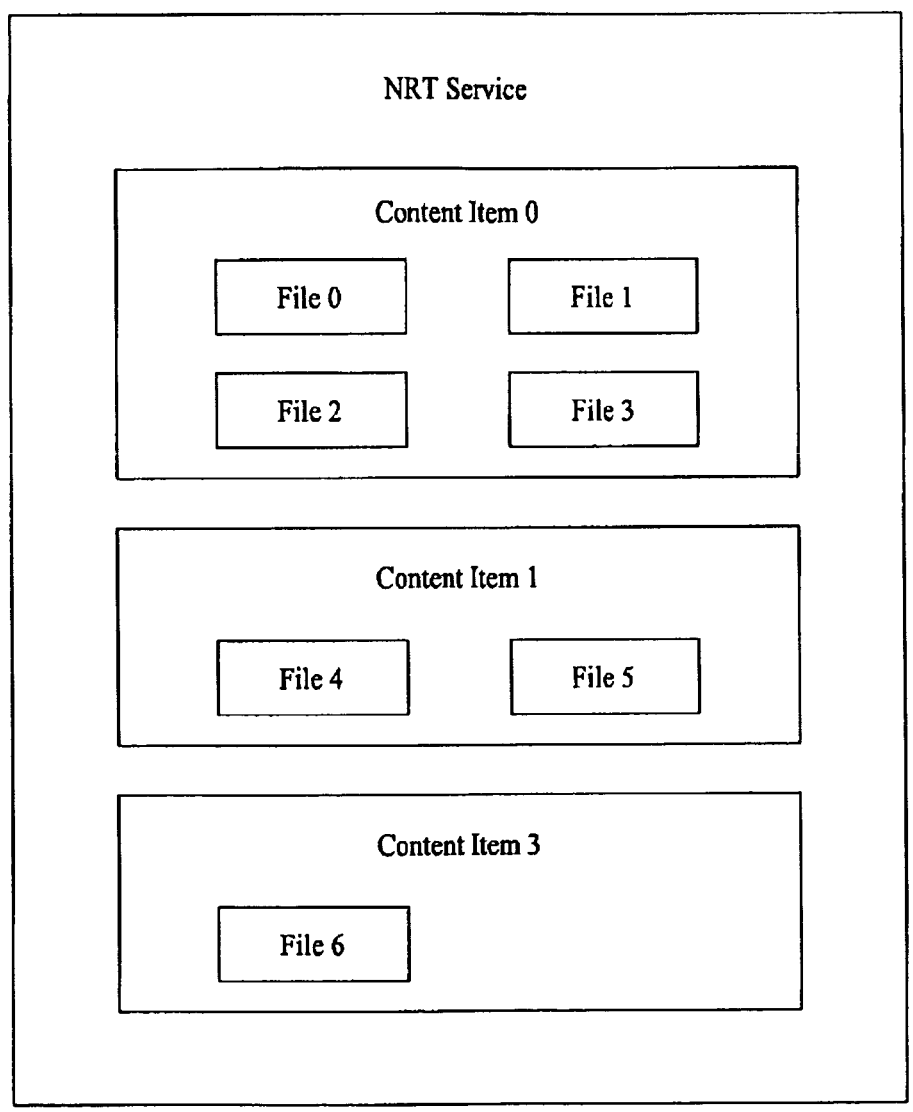
FIG. 2 is an exemplary diagram illustrating the relationship between the NRT Service, Content item, and Files according to an embodiment of the present invention.

FIG. 2 is an exemplary diagram explaining relations between an NRT service, content items and files.

Referring to FIG. 2, an NRT service can include one or more content items. And, each of the content items can include one or more files. And, each of the content items are an independent entity and may correspond to a program or an event in a real time broadcast. Therefore, the NRT service can be defined as a group that is able to service in combination of the above content items.

The content items are the smallest unit that can independently be played. For example, there can be news broadcasted in Non-Real time. The news can include economic section, political section, and weather section. The news can be defined as an NRT service, and the economic, political, and weather sections can each be defined as a content item. And the economic, political, and weather news can be configured as more than one file.

According to the present invention of NRT service, the NRT service can be divided into Fixed NRT Service and Mobile NRT Service depending upon the method of receiving the IP datagram. The Fixed NRT Service is provided through a Fixed broadcast receiver and Mobile NRT Service is provided through a Mobile broadcast receiver. In the present invention, Fixed NRT Service will be explained in detail and then the Mobile NRT Service will be explained according to an embodiment of the present invention.

Figure 3:
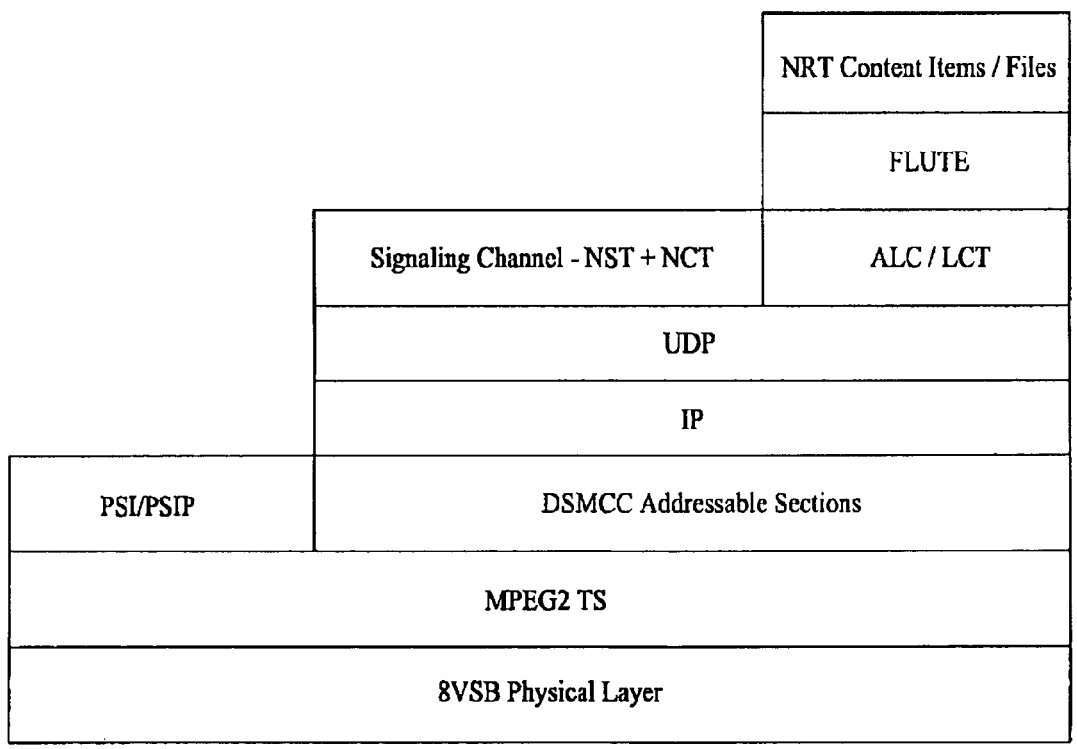
FIG. 3 is a diagram for a protocol stack of a fixed NRT service configured according to an embodiment of the present invention.

FIG. 3 is a diagram for a protocol stack of a fixed NRT service configured according to an embodiment of the present invention.

Referring to FIG. 3, a protocol stack for providing a fixed NRT service transmitting NRT content items and/or files is illustrated. The IP datagram includes NRT content items and/or files and signaling channel for providing NST and NRT-IT. Program and System Information/Program and System Information Protocol (PSI/PSIP) data is delivered through an MPEG-2 TS format.

In FIG. 3, the fixed NRT service is packetized according to User Datagram Protocol (UDP) in an IP layer. The UDP packet becomes UDP/IP packet data by being packetized again according to an IP scheme. In this disclosure, the packetized UDP/IP packet data is referred to as an IP datagram.

The NRT content items/files are packetized according to File Delivery over Unidirectional Transport (FLUTE) scheme or Asynchronous Layered Coding/Layered Coding Transport (ALC/LCT) scheme. The ALC/LCT packet is transported by being encapsulated in a UDP datagram. The ALC/LCT/UDP packet is packetized into ALC/LCT/UDP/IP packet according to IP datagram scheme to become an IP datagram. This IP datagram is contained in MPEG-2 TS through DSM-CC addressable sections for transport. In this case, the ALC/LCT/UDP/IP packet is the information on FLUTE session and includes a File Delivery Table (FDT) as well.

A signaling information channel including an NST and an NRT-IT is packetized according to a UDP scheme. This UDP packet is packetized according to an IP scheme again to become UDP/IP packet data, IP datagram. This IP datagram is also contained in the MPEG-2 TS through the DSM-CC addressable sections for transport.

And, a PSI/PSIP table is separately defined and contained in the MPEG-2 TS. The PSI/PSIP data includes signaling information (DST and TVCT) for identifying an NRT service.

The MPEG-2 TS containing the above described NRT content items/files, signaling information channel and PSI/PSIP data therein are transferred by being modulated by a predetermined transmission scheme such as VSB transmission scheme.

FIG. 4 is a diagram for a bit-stream section of a Terrestrial Virtual Channel Table (TVCT) section configured according to an embodiment of the present invention.

Referring to FIG. 4, a Terrestrial Virtual Channel Table (TVCT) section is described as having a table format similar to that of an MPEG-2 private section. However, this is merely exemplary, and the present invention will not be limited to the examples given herein.

The packet identification (PID) information regarding audio/video is transmitted through TVCT and by parsing the VCT, PID of the audio/video can be known.

The TVCT can be divided into a header, a body and a trailer. The header part ranges from table_id field to protocol_version field. And, transport_stream_id field is a 16-bit field and indicates an MPEG-2 TSID within a Program Association Table (PAT) defined by a PID value of '0' for multiplexing. In the body part, num_channels_in_section field is an 8-bit field and indicates the number of virtual channels within a VCT section. Finally, the trailer part includes CRC_32 field.

First of all, the header part is explained as follows.

A table_id field is an 8-bit unsigned integer number that indicates the type of table section being defined herein. For the terrestrial_virtual_channel_table_section( ), the table_id shall be '0xC8'.

A section_syntax_indicator is a one-bit field which shall be set to '1' for the terrestrial_virtual_channel_table_section( ).

A private_indicator field (1-bit) shall be set to '1'.

A section_length is a twelve bit field, the first two bits of which shall be '00'. This field specifies the number of bytes of the section, starting immediately following the section_length field, and including the CRC. The value in this field shall not exceed 1021.

A table_id_extension field is set to '0x000'.

A version_number field (5-bit) represents the version number of the VCT.

A current_next_indicator is a one-bit indicator, which when set to '1' indicates that the VCT sent is currently applicable.

A section_number field (8 bit) gives the number of this section. The section_number of the first section in the TVCT shall be '0x00'.

A last_section_number field (8 bit) specifies the number of the last section (that is, the section with the highest section_number) of the complete TVCT.

A protocol_version is an 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.

The body part is explained as follows.

A num_channels_in_section field (8-bit) specifies the number of virtual channels in this VCT section. The number is limited by the section length.

A short_name field represents the name of the virtual channel, represented as a sequence of one to seven 16-bit code values.

A major_channel_number field is a 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel.

A minor_channel_number field is a 10-bit number in the range '0' to '999' that represents the "minor" or "sub"-channel number. This field, together with major_channel_number, performs as a two-part channel number, where minor_channel_number represents the second or right-hand part of the number. When the service_type is analog television, minor_channel_number shall be set to '0'. Services whose service_type is either ATSC_digital_television or ATSC_audio_only shall use minor numbers between '1' and '99'. The value of minor_channel_number shall be set such that in no case is a major_channel_number/minor_channel_number pair duplicated within the TVCT.

A modulation_mode field is an 8-bit unsigned integer number that indicates the modulation mode for the transmitted carrier associated with this virtual channel.

A carrier_frequency field includes the recommended value for these 32 bits is zero. Use of this field to identify carrier frequency is allowed, but is deprecated.

A channel_TSID is a 16-bit unsigned integer field in the range '0x0000' to '0xFFFF' that represents the MPEG-2 TSID associated with the TS carrying the MPEG-2 program referenced by this virtual channel.

A program_number field is a 16-bit unsigned integer number that associates the virtual channel being defined here with the MPEG-2 PROGRAM ASSOCIATION and TS PROGRAM MAP tables. For virtual channels representing analog services, a value of '0xFFFF' shall be specified for program_number.

An ETM_location is 2-bit field specifies the existence and the location of an Extended Text Message (ETM).

An access_controlled is a 1-bit Boolean flag that indicates, when set, that the events associated with this virtual channel may be access controlled. When the flag is set to '0', event access is not restricted.

A hidden is a 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.

A hide_guide is a Boolean flag that indicates, when set to '0' for a hidden channel that the virtual channel and its events may appear in EPG displays. This bit shall be ignored for channels which do not have the hidden bit set, so that non-hidden channels and their events may always be included in EPG displays regardless of the state of the hide_guide bit.

Typical applications for hidden channels with the hide_guide bit set to '1' are test signals and services accessible through application-level pointers.

A service_type is a 6-bit enumerated type field that shall identify the type of service carried in this virtual channel. As one embodiment of the present invention, a service_type of a value '0x04' as indicated in FIG. 5, means that it is a ATSC_data_only_service and through the virtual channel, NRT service is being transmitted. In another embodiment of the present invention, if the service_type value is '0x08' as indicated in FIG. 6, meaning that it is ATSC_nrt_service and that the virtual channel carries an NRT service conforming to ATSC standards.

A source_id field (16-bit) represents a programming source associated with a virtual channel.

A descriptors_length field is total length (in bytes) of the descriptors for this virtual channel that follows.

A descriptor( ) field includes zero or more descriptors, as appropriate, may be included.

An additional_descriptors_length field is total length (in bytes) of the VCT descriptor list that follows.

The trailor part is explained as follows. CRC_32 is a 32-bit field that contains the cyclic redundancy check (CRC) value that ensures a zero output from the registers in the decoder.

NRT content is transferred through IP mechanism. In order to transfer IP datagram through a digital broadcast stream, ATSC has regulated ATSC A/90 and A/92 specifications.

FIG. 7 is a diagram for a hit-stream syntax of a Data Service Table (DST) section to identify an NRT application configured according to an embodiment of the present invention.

The semantics of the fields comprising the data_service_table_bytes structure are defined below.

An sdf_protocol_version is an 8-bit field which shall be used to specify the version of the Service Description Framework (SDF) protocol. The value of this field shall be set to '0x01'. The value '0x00' and the values in the range '0x02' to '0xFF' shall be ATSC reserved.

An application_count_in_section is an 8-bit field (8-bit) shall specify the number of applications listed in the DST section.

A compatibility_descriptor( ) field shall contain a DSM-CC compatibility descriptor. Its purpose shall be to signal compatibility requirements of the application so that the receiving platform can determine its ability to use this data service.

An app_id_byte_length field (16-bit) shall specify the number of bytes used to identify the application. The value of this field shall account for the length of both the app_id_description field and the app_id_byte fields that follow. The value '0x0000' shall indicate that no app_id_field or app_id_byte fields follow. The value '0x0001' is forbidden.

An app_id_description field (16-bit) shall specify the format and semantics of the following application identification bytes.

Table 1 specifies the values and associated formats.

TABLE 1

| Value | Application Identifier Format |
|---|---|
| 0x0000 | DASE application |
| 0x0001 | ATSC reserved |
| 0x0002 | ATSC A/92 Application |
| 0x0003 | NRT Application |
| 0x0004-0x7FFF | ATSC reserved |
| 0x8000-0xFFFF | User private |

An app_id_byte field (8-bit) shall represent a byte of the application identifier.

A tap_count field (8-bit) shall specify the number of Tap( ) structures used by this application.

A protocol_encapsulation field (8-bit) shall specify the type of protocol encapsulation used to transmit the particular data element referred to by the Tap( ).

An action_type field (7-bit) shall be used to indicate the nature of the data referred to by the Tap( ).

A resource_location field (1-bit) shall specify the location of the Association Tag field matched with the association_tag value listed in the following Tap structure. This bit shall be set to '0' when the matching association_tag resides in the PMT of the current MPEG-2 program. This bit shall be set to '1' when the matching association_tag resides in a DSM-CC Resource Descriptor within the Network Resources Table of this Data Service.

A Tap( ) field can be defined by including the following fields. A tap_id field (16-bit) shall be used by the application to identify the data elements. The value of tap_id is scoped by the value of the app_id_byte fields associated with the Tap ( ) in the DST. The tap_id field is unique within an application. The tap_id value is selected by the data service provider at authoring time. It is used in the application as a handle to the data element.

A Use field (16-bit) is used to characterize the communication channel referenced by the association_tag. Use of use values other than '0x0000' is beyond the scope of this standard. The use value '0x0000' indicates that this field is unknown.

An association_tag field (16-bit) shall uniquely identify either a data elementary stream listed in the PMT or a DSM-CC Resource Descriptor listed in the Network Resource Table. In the former case, the value of this field shall be matched with the association_tag value of an association_tag_descriptor in the PMT of the data service. In the latter case, the value of this field shall match the association_tag value in the commonDescriptorHeader structure of a DSM-CC Resource Descriptor in the Network Resource Table of the data service.

A selector_length is an 8-bit field which shall specify the length of the remaining selector structure in bytes. A value equal to 0 shall indicate that no selector information is present. When the value of the selector_type field is equal to 0x0102, this field shall be set to a value less or equal to 8.

A tap_info_length is a 16-bit field which shall specify the number of bytes of the descriptors following the tap_info_length field.

A descriptor( ) shall follow the descriptor format.

An app_info_length is an 8-bit field which shall specify the number of bytes of the descriptors following the app_info_length field.

A descriptor( ) shall follow the descriptor format.

An app_data_length is a 16-bit field which shall specify the length in bytes of the following app_data_byte fields.

An app_data_byte is an 8-bit field which shall represent one byte of the input parameters and other private data fields associated with the application.

A service_info_length is an 8-bit field which shall specify the number of bytes of the descriptors following the service_info_length field.

A descriptor( ) shall follow the descriptor format.

A service_private_data_length is a 16-bit field which shall specify the length in bytes of the private fields to follow.

A service_private_data_byte is an 8-bit field which shall represent one byte of the private field.

Figure 8:
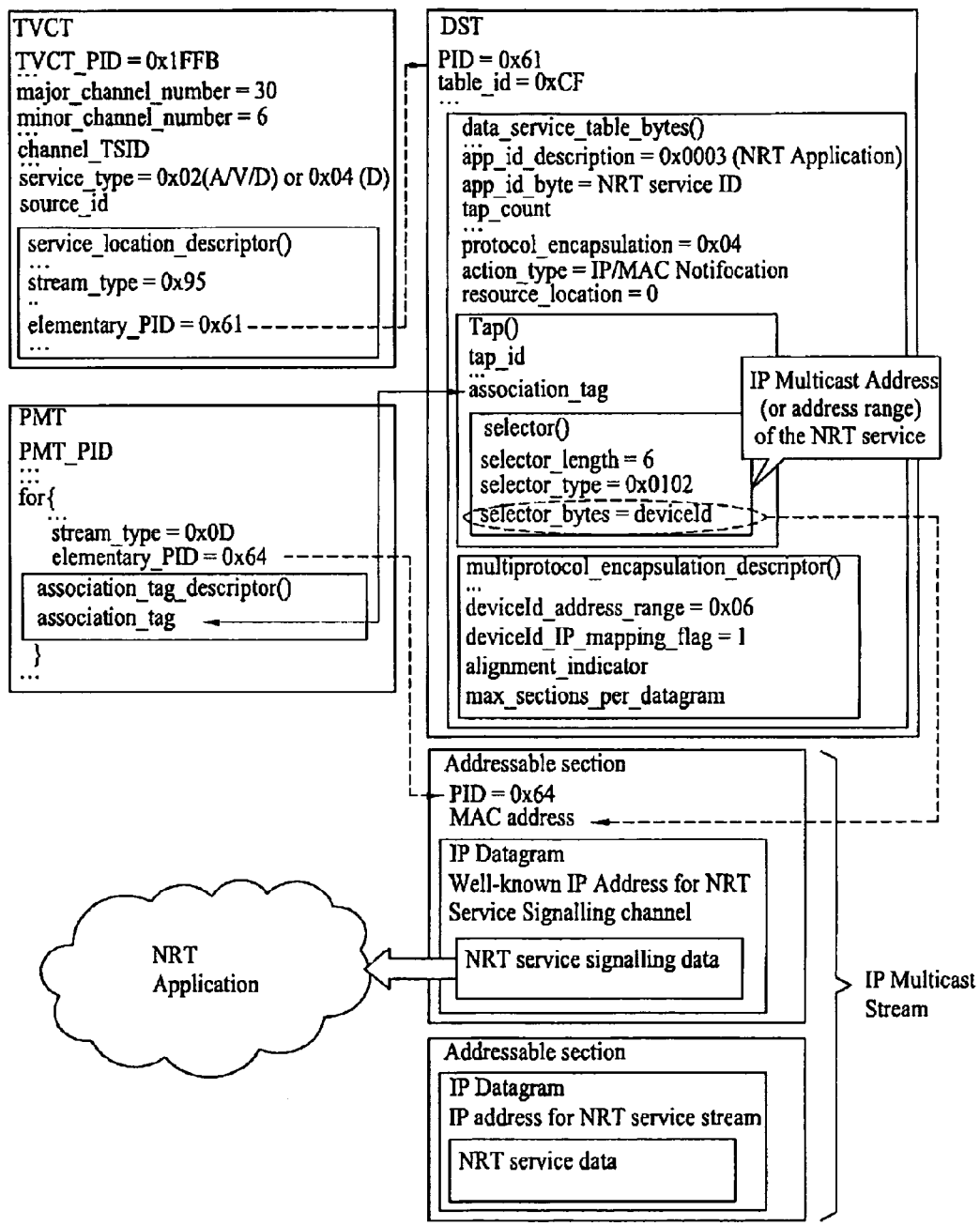
FIG. 8 is a diagram for a signaling method in case of transmitting an NRT service through an ATSC broadcasting system using the PSI/PSIP table according to an embodiment of the present invention.

FIG. 8 is an exemplary diagram for a signaling method in case of transmitting an NRT service through an ATSC broadcasting system according to another embodiment of the present invention, and FIG. 9 is an exemplary flowchart for FIG. 8.

FIG. 8 shows a method of configuring a separate NRT service signaling channel via an IP side. In this case, the NRT service signaling channel is multicasted by being encapsulated in an IP datagram via a well-known IP address. A signaling structure for this case is shown in FIG. 8. In particular, it can be observed that a separate NRT service signaling channel exists as an IP multicast stream, whereas every signaling is performed by a PSIP side.

The TVCT is similar to a channel concept and for example, the TVCT_PID equals to '0x1FFB.' The service_type of TVCT refers to the service of the present TVCT which identifies that the service is an NRT application and the stream_type which equals to for example '0x95' means that it is association with the Data Service Table (DST). The app_id_ field in the DST also identifies that the service is an NRT application. As shown in FIG. 8, the association_tag of the PMT has the same value with the Tap association_tag in the DST. After matching the association tag between the PMT and the DST, the elemenrayr_PID of the PMT is needed to identify the IP datagram of the NRT service signaling channel or the NRT service. As explained above, when the protocol_encapsulation=0x04, an asynchronous IP datagram is transferred. If selector_type is set to '0x0102', a value of device_id, which indicates a destination address, is delivered through selector_bytes. In order to accurately interpret a value of the selector_bytes, multiprotocol_encapsulation_descriptor is used. And, the number of valid bytes in the device_id value is signaled.

A Tap( ) in the DST is used to find an application-level data element contained in a lower-layer communication channel. An association is made between the application-level data element and the Tap( ) through the use of an association_tag field. The value of the association_tag field in a Tap structure shall correspond to the value of either an association_tag field located in one Association Tag descriptor residing in the current PMT or an associationTag field located in the commonDescriptorHeader of one of the dsmccResourceDescriptor descriptors residing in the Network Resource Table. In a data service, the same association_tag value may be featured in more than one Tap structure. The association_tag shall be used as the base for determining the location of a data element. Relative to this base, the location of the data element may be further specified by means of the selector structure. A data receiver needs a reference list of all synchronized data elementary streams in a data service to be able to partition the Data Elementary Stream Buffer properly. Consequently, the DST shall include at least one Tap( ) for each of the data elementary streams of stream_type value 0x06 or 0x14 belonging to the data service.

A multiprotocol_encapsulation_descriptor may be included in the descriptor loop following the Tap structure in the Data Service Table when the value of the protocol_encapsulation field is equal to 0x03 or 0x04. The descriptor provides information defining the mapping of the deviceId fields to a specific addressing scheme. The descriptor also provides information on the number of valid bytes in the deviceId fields specified in the selector bytes of a Tap( ) including a selector_type field value equal to 0x0102. Finally, this descriptor may be used to signal alignment and protocol fragmentation rules.

A deviceId_address_range=0x06 means that the valid deviceID_address bytes equal to deviceId[47 . . . 0]. Further device_Id_IP_mapping_flag, when set to 1 means to signal an IP to MAC address mapping.

An alignment_indicator shall indicate byte level alignment between the DSMCC_addressable_section and the Transport Stream bytes.

And max_sections_per_datagram, an 8-bit field, shall indicate the maximum number of Sections that can be used to carry a single datagram unit.

Further, the well-known IP address for NRT service signaling channel (NST and NRT-IT) is defined through elementary_PID associated with the PMT. Moreover, the NRT service signaling data is transmitted and received through the well-known IP address for NRT service signaling channel of the IP Datagram. The NRT service signaling data can be transmitted in Transport Packet (TP) or via Internet Protocol (IP).

FIG. 9 is a flowchart of the above explanation.

Referring to FIG. 9, after a power of a receiver has been turned on, if a default channel or a channel by a user is selected [S1001], the receiver receives a TVCT or a PMT [S1002].

With regard to this, information on a stream configuring each virtual channel is signaled to service_location_descriptor of the TVCT or the ES_loop of the PMT.

Therefore, the receiver determines a type of a service provided on a selected channel by parsing service_type within the received TVCT [S1003]. For instance, if a value of the service_type is set to '0x02', a type of a corresponding service provided on the selected channel may mean a digital A/V Data service type. If a value of the service_type is set to '0x04', a type of a corresponding service provided on the selected channel may mean a data only service type. If a value of the service_type is set to '0x08', a type of a corresponding service provided on the selected channel may mean an NRT only service type.

As a result of the determining step [S1003], if the corresponding service type is not a general A/V service, PID ('0x61') of a data service table (DST) is extracted by parsing service_location_descriptor in the channel loop of the TVCT [S1004].

Subsequently, the DST is received using the extracted PID [S1005].

It is then determined whether the corresponding service provided on the selected channel is an NRT service from the received DST [S1006]. In doing so, the determination of a presence or absence of the NRT service can be performed by checking app_id_description within the DST. For instance, if a value of the app_id_description is set to '0x0003', it means that the corresponding service is an NRT application.

As a result of the determining step [S1006], if the corresponding service is an NRT service, a tap including an NRT service signaling channel is extracted [S1007]. And, elementary_PID including association_tag of the tap on the PMT is extracted [S1008].

After the elementary_PID has been received, a DSM-CC addressable section is processed [S1009].

Subsequently, after an IP packet has been received from a well-known IP address of the NRT service signaling channel [S1010], an NRT service is provided by processing the NRT service signaling data within the received IP packet [S1011].

With regard to this, after checking whether the NRT application exists on the virtual channel by the above method, an IP stream carrying the well-known IP address, to which the NRT service signaling data carried via an IP layer is delivered, is searched for using the tap information.

If a value of protocol_encapsulation is set to '0x04', an asynchronous IP datagram is transferred. If selector_type is set to '0x0102', a value of device_id indicating a destination address is delivered via selector_bytes.

Therefore, a PID of a transport stream can be known, on which the corresponding data is carried, through the tap information on a multicast address (or, an address range) of an IP datagram. It is checked whether a well-known IP address, to which NRT service signaling data will be delivered, is loaded on the tap. This is received in the first place. An IP packet is then received.

Subsequently, NRT service signaling data is extracted from the IP packet. The extracted NRT service signaling data is delivered to an NRT application manager. A corresponding service is then initiated.

FIGS. 10 and 11 are an exemplary diagram for a bit-stream syntax of NST configured according to an embodiment of the present invention.

In this case, although a corresponding syntax is written as an MPEG-2 private section to help the understanding, a format of corresponding data can have any type. For instance, SDP( ) is used to perform signaling via a Session Announcement Protocol (SAP).

NST describes service information and IP access information within a virtual channel carrying the NST. The NST also provides NRT broadcast stream information of a corresponding service using NRT_service_id that is an identifier of an NRT broadcast stream to which each service belongs. And, NST according to the present embodiment includes description information of each fixed NRT service within one virtual channel. And, other side information can be included in a descriptor region.

A table_id field is an 8-bit unsigned integer number that indicates the type of table section being defined in NST.

A section_syntax_indicator field (1-bit) shall be set to '0' to always indicate that this table is derived from the short form of the MPEG-2 private section table.

A private_indicator field (1-bit) shall be set to '1'.

A section_length field (12-bit) specifies the number of remaining bytes this table section immediately following this field. The value in this field shall not exceed 4093 ('0xFFD').

A table_id_extension field (16-bit) is table-dependent. It shall be considered to be logically part of the table_id field providing the scope for the remaining fields. Herein, the table_id_extension field includes an NST_protocol_version field.

The NST_protocol_version is an 8-bit unsigned integer field whose function is to allow, in the future, this NRT Service Table to carry parameters that may be structured differently than those defined in the current protocol. At present, the value for the NST_protocol_version shall be zero. Non-zero values of NST_protocol_version may be used by a future version of this standard to indicate structurally different tables.

A version_number field (5-bit) represents a version number of the NST.

A current_next_indicator is a one-bit indicator, which when set to '1' shall indicate that the NRT Service Table sent is currently applicable. When the bit is set to '0', it shall indicate that the table sent is not yet applicable and will be the next table to become valid. This standard imposes no requirement that next tables (those with current_next_indicator set to '0') must be sent. An update to the currently applicable table shall be signaled by incrementing the version_number field.

A section_number field (8-bit) shall give the section number of this NRT Service table section. The section_number of the first section in an NRT Service table shall be '0x00'. The section_number shall be incremented by 1 with each additional section in the NRT Service table.

A last_section_number field (8-bit) shall give the number of the last section (the section with the highest section_number) of the NRT Service table of which this section is a part.

A num_NRT_services field (8-bit) specifies the number of NRT services in this NST section.

According to an embodiment of the present invention, an NST provides information for a plurality of fixed NRT services using a 'for' loop. Field information which is included in each fixed NRT service is explained as follows.

An NRT_service_id is a 16-bit unsigned integer number that shall uniquely identify this NRT Service within the scope of this NRT Broadcast. The NRT_service_id of a service shall not change throughout the life of the service. To avoid confusion, it is recommended that if a service is terminated, then the NRT_service_id for the service should not be used for another service until after a suitable interval of time has elapsed.

An NRT_service_status is a 2-bit enumerated field that shall identify the status of this NRT Service. The most significant bit shall indicate whether this NRT Service is active (when set to '1') or inactive (when set to '0') and the least significant bit shall indicate whether this NRT service is hidden (when set to '1') or not (when set to '0'). Hidden services are normally used for proprietary applications, and ordinary receiving devices should ignore them.

A SP_indicator is a 1-bit field that shall indicate, when set, that service protection is applied to at least one of the components needed to provide a meaningful presentation of this NRT Service.

A short_NRT_service_name_length is a three-bit unsigned integer that shall indicate the number of byte pairs in the short_NRT_service_name field. This value is shown as 'm' in the No. of Bits column for the short_NRT_service_name field. When there is no short name of this NRT service, the value of this field shall be '0'.

A short_NRT_service_name field is a short name of the NRT Service. When there is no short name of this NRT Service, this field shall be filled with NULLs ('0x00').

An NRT_service_category is a 6-bit enumerated type field that shall identify the type of service carried in this IP Service.

A num_components field (5-bit) specifies the number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of 1 for this field is reserved for possible future indication that source_IP_address, NRT_service_destination_IP_address, and component_destination_IP_address fields are for IPv6.

A source_IP_address_flag is a 1-bit Boolean flag that shall indicate, when set, that a source IP address value for this NRT Service is present to indicate a source specific multicast.

An NRT_service_destination_IP_address_flag is a 1-bit Boolean flag that indicates, when set to '1', that an NRT_service_destination_IP_address value is present, to serve as the default IP address for the components of this NRT Service.

A source_IP_address field shall be present if the source_IP_address_flag is set to '1' and shall not be present if the source_IP_address_flag is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address field shall be present if the NRT_service_destination_IP_address_flag is set to '1' and shall not be present if the NRT_service_destination_IP_address_flag is set to '0'. If this NRT_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined.

According to an embodiment of the present invention, the NST provides information for a plurality of components using a 'for' loop.

An essential_component_indicator is a one-bit indicator which, when set to '1', shall indicate that this component is an essential component for the NRT Service. Otherwise, this field indicates that this component is an optional component.

A port_num_count field shall indicate the number of destination UDP ports associated with this UDP/IP stream component. The values of the destination UDP port numbers shall start from the component_destination_UDP_port_num field and shall be incremented by one.

A component_destination_IP_address_flag is a 1-bit Boolean flag that shall indicate, when set to '1', that the component_destination_IP_address is present for this component.

A component_destination_IP_address field shall be present if the component_destination_IP_address_flag is set to '1' and shall not be present if the component_destination_IP_address_flag is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined.

A component_destination_UDP_port_num is a 16-bit unsigned integer field that represents the destination UDP port number for this UDP/IP stream component.

A num_component_level_descriptors is a 16-bit unsigned integer field, that represents the number of descriptors providing additional information for IP stream component, may be included.

A component_level_descriptors field includes one or more descriptors providing additional information for this IP stream component, may be included. A num_NRT_service_level_descriptors field (4 bit) specifies the number of NRT service level descriptors for this service.

An NRT_service_level_descriptor( ) field includes zero or more descriptors providing additional information for this NRT Service, may be included. This detailed service type can include a portal service for providing web contents, Push VOD, A/V download or the like. The Receiver Targeting Descriptor configured according to an embodiment of the present invention will go in this section to provide specific receiver targeting information for each content in the "for" loop.

A num_virtual_channel_level_descriptors field (4-bit) specifies the number of virtual channel level descriptors for this virtual channel.

A virtual_channel_level_descriptor( ) includes zero or more descriptors providing additional information for the virtual channel which this NST describes, may be included.

An NRT service is transferred via FLUTE and access information in an NST table is connected to FLUTE session information as follows. A Source_IP_address becomes a source IP address of a same server that transmits all channels of FLUTE session. NRT_service_destination_IP_Address is signaled if there exists a destination IP address at a session level of this FLUTE session.

A component can be mapped to a channel within a FLUTE session and can signal a separate destination IP address per channel (this is different from an IP address signaled by a session unit) through component_destination_IP_address. Moreover, a destination port number is signaled through component_destination_UDP_port_num. And, it is able to additionally designate the number of destination ports starting from component_destination_UDP_port_num through port_num_count.

By designating ports to a plural number, it is able to construct a plurality of channels for one destination IP address. In this case, one component is able to designate a plurality of channels. Yet, it is preferable that a channel is identified via a destination IP address in general. In this case, one channel can be regarded as mapped to one component.

Content items/files for an NRT service are transferred through FLUTE and corresponding FLUTE session information is signaled using access information in an NST table.

FIG. 12 is an exemplary diagram for a bit-stream syntax of NRT_component_descriptor( ) configured according to an embodiment of the present invention.

An NRT Component data means NRT content items or files delivered through a FLUTE session.

An NRT_component_descriptor( ) shall appear in the component descriptor loop of each component of each NRT service in the NST and all parameters in the descriptor shall correspond to the parameters in use for that component of the NRT service.

In the following description, each field information carried on NRT_component_descriptor shown in FIG. 12 is described.

A descriptor_length is a 8-bit unsigned integer that shall specify the length (in byes) immediately following this field up to the end of this descriptor.

A component_type field (7-bit) shall identify the encoding format of the component. The value may be any of the values assigned by IANA for the payload_type of an RTP/AVP stream [10], or it may be any of the values in Table 2 in this disclosure, or it may be a "dynamic value" within the range of 96 to 127. For components consisting of media carried via RTP, the value of this field shall match the value in the payload_type field in the RTP header of the IP stream carrying this component.

Note that additional values of the component_type field within the range of 43 to 71 can be defined in future versions of this standard. The NRT service stream transmitted through FLUTE protocol further requires parameters further to signal a FLUTE session as a Table 2. In the Table 2, '38' of component_type being defined for FLUTE component in the ATSC or '43' of component_type newly being defined for transmission NRT may be used.

TABLE 2

| component_type | Meaning |
| --- | --- |
| 0-34 | Assigned or reserved by IANA, except that 20-24, 27, and 29-30 are unassigned |
| 35 | H.264/AVC video stream component (assigned by ATSC use) |
| 36 | SVC enhancement layer stream component (assigned by ATSC use) |
| 37 | HE AAC v2 audio stream component (assigned by ATSC use) |

TABLE 2-continued

| component_type | Meaning |
| --- | --- |
| 38 | FLUTE file delivery session (assigned by ATSC use) |
| 39 | STKM stream component (assigned by ATSC use) |
| 40 | LTKM stream component (assigned by ATSC use) |
| 41 | OMA-RME DIMS stream component (assigned by ATSC use) |
| 42 | NTP timebase stream component (assigned by ATSC use) |
| 43-71 | [Unassigned by IANA and reserved by ATSC use] |
| 72-76 | Reserved by IANA |
| 77-95 | Unassigned by IANA |
| 96-127 | Designated by IANA for dynamic use |

A num_STKM_streams is an 8-bit unsigned integer field that shall identify the number of STKM streams associated with this component.

A STKM_stream_id is an 8-bit unsigned integer field that shall identify an STKM stream where keys to decrypt this protected component can be obtained, by reference to the STKM_stream_id in the component descriptor for the STKM stream.

An NRT_component_data (component_type) is explained as follow. The NRT_component_data( ) element provides the encoding parameters and/or other parameters necessary for rendering this component. The structure of the NRT_component_data is determined by the value of component_type field.

The FDT of the FLUTE sessions which is used to deliver the items lists all the content items and gives their sizes, data types, and other information relevant to the acquisition of the items.

Therefore, the present invention obtains information for accessing a FLUTE session carrying a corresponding content using NST to receive a content selected from a service guide constructed using NRT-IT. And, the present invention intends to map information on a content item of NRT-IT to information on a file transferred via a corresponding FLUTE session. In this case, identification of a service including the selected content item can be done via the NRT_service_id of the aforesaid NST.

The NRT service is transferred via FLUTE and access information in an NST is connected to FLUTE session information as follows. A Source_IP_address becomes a source IP address of a same server that transmits all channels of FLUTE session. NRT_service_destination_IP_Address is signaled if there exists a destination IP address at a session level of this FLUTE session.

A component can be mapped to a channel within a FLUTE session and can signal a separate destination IP address per channel (this is different from an IP address signaled by a session unit) through component_destination_IP_address. Moreover, a destination port number is signaled through component_destination_UDP_port_num. And, it is able to additionally designate the number of destination ports starting from component_destination_UDP_port_num through port_num_count.

By designating ports to plural number, it is able to construct a plurality of channels for one destination IP address. In this case, one component is able to designate a plurality of channels. Yet, it is recommended that a channel is identified via a destination IP address in general. In this case, one channel can be regarded as mapped to one component.

In order to signal an additional attribute of a component constructing a session, it is able to use component_attribute_byte. Additional parameters required for signaling a FLUTE session can be signaled through this field.

In order to signal the FLUTE session, parameters are necessary. Such parameters include necessary parameters and parameters which are selectively necessary in association with the FLUTE session. First, the necessary parameters include a "source IP address" parameter, a "number of channels in the session" parameter, a "destination IP address and port number for each channel in the session" parameter, a "Transport Session Identifier (TSI) of the session" parameter and a "start time and end time of the session" parameter, and the parameters which are selectively necessary in association with the FLUTE session include an "FEC object transmission information" parameter, a "some information that tells a receiver in the first place, that the session contains files that are of interest", and a "bandwidth specification" parameter.

The "number of channels in the session" parameter may be explicitly provided or may be obtained by summing the number of streams configuring the session. Among the parameters, the "start time and end time of the session" parameter, the "source IP address" parameter, the "destination IP address and port number for each channel in the session" parameter, the "Transport Session Identifier (TSI) of the session" parameter and the "number of channels in the session" parameter may be signaled through NST and component_descriptor.

FIG. 13 is an exemplary diagram for a bit-stream syntax of an NRT FLUTE component descriptor in which one is the NRT_FLUTE_component_data configured according to an embodiment of the present invention.

A single NRT service may contain multiple FLUTE sessions. Each session may be signaled using one or more FLUTE component descriptors, depending on the IP addresses and ports used for the sessions.

In the following description, each field of NRT_FLUTE_component_data( ) is explained in detail.

A TSI is a 16-bit unsigned integer field, which shall be the Transport Session Identifier (TSI) of the FLUTE session.

A session_start_time indicates the time at which the FLUTE session starts. If the value of this field is set to all zero, then it shall be interpreted to mean that the session has already started.

A session_end_time indicates the time at which the FLUTE session ends. If the value of this field is set to all zero, then it shall be interpreted to mean that the session continues indefinitely.

A tias_bandwidth_indicator is a 1-bit field that flags the inclusion of Transport Independent Application Specific (TIAS) bandwidth information. This bit shall be set to '1' to indicate the TIAS bandwidth field is present, and it shall be set to '0' to indicate the TIAS bandwidth field is absent.

An as_bandwidth_indicator is a 1-bit field that flags the inclusion of Application Specific (AS) bandwidth information. This bit shall be set to '1' to indicate the AS bandwidth field is present, and it shall be set to '0' to indicate the AS bandwidth field is absent.

A FEC_OTI_indicator is a 1-bit indicator that indicates whether FEC Object Transmission Information is provided.

A tias_bandwidth field has a value. This value shall be one one-thousandth of the TIAS maximum bandwidth, rounded up to the next highest integer if necessary.

An as_bandwidth has a value. This value shall be the AS maximum bandwidth.

A FEC_encoding_id field identifies a FEC encoding ID used in this FLUTE session.

A FEC_instance_id field identifies a FEC instance ID used in this FLUTE session.

By signaling the above described parameters, it is able to provide all information mandatory to receive a FLUTE session. And, it is able to use a method of receiving FDT via this session, obtaining information on all files carried on a FLUTE session via the received FDT and receiving theses files.

This FLUTE component descriptor can be delivered via component_level_descriptor loop of NST. In case that there is a plurality of FLUTE channels, such parameters at a session level as TSI, session_start_time, session_end_time and the like should be signaled only once. Hence, one of components of several channels can transmit a FLUTE component descriptor via Component_level_descriptor loop.

FIGS. 14 and 15 are diagrams of a bit-stream syntax of an NRT Information Table (NRT-IT) section to identify an NRT application configured according to an embodiment of the present invention.

The information provided in the NRT-IT includes the title of the content (for example, the name of the program available for download), the times during which the content is to be made available for download, and information such as content advisories, availability of caption services, content identification, and other metadata. One item of content may consist of one or more files. For example, an audio/video clip may come with a JPEG thumbnail image that can be used to represent it in on-screen displays.

An instance of the NRT-IT can include data corresponding to an arbitrarily defined time period, or can describe NRT content starting at a specified time and into the indefinite future. Each NRT-IT instance indicates the start time of the period it covers and the length of the period it covers (which may be indefinite). Each NRT-IT instance may be segmented into as many as 256 sections. One section may contain information for multiple content items, but the information for any given content item shall not be segmented and put into two or more sections.

Any content item to be made available for download for a time interval that extends beyond the time period covered one or more NRT-IT instances shall be described only in the first of these NRT-ITs. Content item descriptions are placed within the NRT_information_table_section( ) in the order of their first availability. Therefore, when last_section_number is greater than zero (meaning the NRT-IT is delivered in multiple sections), for sections other than the first (sections for which the value of section_number is greater than zero), all the content item descriptions within a given section shall have first availability times that are greater than or equal to all first availability times of content item descriptions in the immediately preceding section (the section whose value of section_number is one lower than the given section).

Each NRT-IT identifies NRT services associated with the given value of service_id available on a particular virtual channel sometime during the time period it covers.

A table_id field (8-bit) is set to 0xTBD to identify this table section as belonging to the Non-Real-Time Information Table.

A service_id field (16-bit) specifies the service_id field associated with the NRT service offering content items described in this section.

A NRT_IT_version_number field (5-bit) indicates the version number of this NRT-IT instance, where NRT-IT instance is defined as the set of one or more NRT_information_table_section( ) having common values for service_id field, current_ next_indicator field, protocol_version field, and time_span_ start field. The version number is incremented by 1 modulo 32 when any field in the NRT-IT instance changes.

A current_next_indicator (1-bit) field is always set to '1' for NRT-IT sections; the NRT-IT sent is always currently applicable.

A protocol_version field (8-bit) is set to zero. The function of protocol_version field is to allow, in the future, this table type to carry parameters that may be structured differently than those defined in the current protocol. At present, the only valid value for protocol_version field is zero. Non-zero values of protocol_version field may be used by a future version of this standard to indicate structurally different tables.

A time_span_start field (32-bit) represents the start of the time span covered by this instance of the NRT-IT, expressed as the number of GPS seconds since 00:00:00 UTC, Jan. 6, 1980. The time of day of time_span_start field is aligned to minute 00 of the hour. The value zero for time_span_start field indicates the time period covered by his NRT-IT instance began in the indefinite past. The value of time_span_start field is the same for each section of a multi-sectioned NRT-IT instance. The values of time_span_start field and time_span_length field are set such that the specified time span does not overlap with any other NRT-IT instance in this IP subnet.

A time_span_length field (11-bit) indicates the number of minutes, starting at the time indicated by time_span_start field, covered by this instance of the NRT-IT. Once established, the value of time_span_length field for a given value of time_span_start field does not change. A value of time_span_length field of zero means this NRT-IT instance covers all time starting at time_span_start field into the indefinite future. If the value of time_span_start is zero, time_span_length field has no meaning. The value of time_span_length field is the same for each section of a multi-sectioned NRT-IT instance. The values of time_span_start field and time_span length field are set such that the specified time span does not overlap with any other NRT-IT instance in this IP subnet.

A num_items_in_section field (8-bit) indicates the number of content items described in this NRT-IT section.

A content_linkage field (32-bit) in the range 0x0001 to 0xFFFFFFFF specifies the identification number of the content (or content item) described. Value 0x0000 is not used. The content_linkage field performs two linkage functions: it links metadata in the NRT-IT to one or more files in the FLUTE FDT associated with this NRT service; it also forms the TF_id field (identifier for Text Fragment in Text Fragment Table). The value of the content_linkage field corresponds to either the value of one of the FDT-Content-Linkage elements or the value of one of the File-Content-Linkage elements in the FLUTE FDT for each file associated with the content item. The precedence rules may be applied when matching each content_linkage value with the corresponding content linkage elements in the FLUTE FDT.

A TF_available field is Boolean flag, this field specifies, when set to '1' that a Text Fragment is present in a Text Fragment Table in the service signaling channel. When the field is set to '0,' no Text Fragment is included in the service signaling channel for this content item.

A low_latency field is Boolean flag, this field specifies, when set to '1,' that the content is available within the current digital transport with a low enough latency that its retrieval should be attempted while the user waits. When the field is set to '0', retrieval latency is longer and the user interface should suggest to the user to return later for viewing.

A playback_length_in_seconds field (20-bit) specifies the duration of playback of the content, in seconds. For content consisting only of text and/or still images, the value zero is used. For content that includes audio or audio/video content, the playback_length_in_seconds field indicates the playback length of the audio or audio/video content.

A content_length_included field is Boolean flag, this field indicates, when set to '1,' that the content_length field is present in this iteration of the "for" loop. Setting this field to '0' indicates the content_length field is not present in this iteration of the "for" loop.

A playback_delay_included field is Boolean flag, this field indicates, when set to '1,' that the playback_delay field is present in this iteration of the "for" loop. Setting this field to '0' indicates the playback_delay field is not present in this iteration of the "for" loop.

An expiration_included field is Boolean flag, this field indicates, when set to '1,' that the expiration field is present in this iteration of the "for" loop. Setting this field to '0' indicates the expiration field is not present in this iteration of the "for" loop.

A duration field (12-bit) in the range 1 to 2880 specifies the expected cycle time, in minutes, of the carousel containing the referenced content item. A broadcast receiver is expected to use the duration parameter to determine the amount of time needed to capture the referenced content.

A content_length field (40-bit), when present, represents the total size in bytes of the content item or items. This item is used by the broadcast receiver to determine if enough memory is available to store it before downloading is attempted.

A playback_delay field (20-bit) counts of the number of seconds following reception of the first byte of the associated content the broadcast receiver waits before playback may start, while buffering the incoming stream. A value of zero indicates playback may commence immediately. When playback_delay field is not provided, the broadcast receiver is expected to retrieve the complete file or file set prior to playback.

An expiration field (32-bit) represents the expiration time of the content, expressed as the number of GPS seconds since 00:00:00 UTC, Jan. 6, 1980. Following expiration, the content is deleted from memory. If an expiration time is not specified, broadcast receivers are expected to use methods of their own choosing to manage memory resources.

A content_name_length field (8-bit) specifies the length (in bytes) of the content_name_text( ).

A content_name_text( ) field specifies the content item title in the format of a multiple string structure.

A content_descriptors_length field (12-bit) indicates the total length (in bytes) of the content_descriptor ( ) that provide additional information about the content level.

A content_descriptor( ) is separately applied to each content item. The Receiver Targeting Descriptor configured according to an embodiment of the present invention will be inserted in this descriptor loop. The description of the Receiver Targeting Descriptor will be explained below with FIG. 16.

A descriptors_length field (10-bit) indicates the total length (in bytes) of the descriptor ( ).

A descriptor( ) is commonly applied to all content items described in the current NRT-IT section.

FIG. 16 is a diagram of a bit-stream syntax for the Receiver Targeting Descriptor according to an embodiment of the present invention. In an ATSC fixed broadcast, the receiver_targeting_descriptor may go in the descriptor loop of an NRT service in the NST, and it may go in the descriptor loop of a content item in the NRT-IT. In the former case it shall apply to all content items of the service. The necessary fields are explained below.

A num_targeting_entries is an 8-bit unsigned integer that shall give the number of targeting entries in the loop following this field (where each entry has a targeting_criterion_type_code, targeting_value_length, and targeting_value).

A targeting_criterion_type_code is a 5-bit unsigned integer that specifies the type of value contained in the target_value field. The values for target_criterion_type_code shall be defined by the Targeting Criterion Type Codes illustrated in FIG. 17.

A targeting_value_length_minus_1 is a 3-bit unsigned integer field that specifies the number of bytes used for the targeting_value of this entry. The actual number of bytes for the targeting_value is obtained by adding one to the value of targeting_value_length_minus_1. This field is included to support extensibility of the set of targeting criteria.

A targeting_value is a variable-length unsigned integer field that contains the targeting value, as in the Targeting Criterion Type Codes illustrated in FIG. 17.

If num_targeting_entries is greater than one, the result of each targeting_code in the "for" loop shall be evaluated as an intermediate term. Among these intermediate terms, ones with the same value of target_criterion_type_code shall be logically obtained by 'OR' function and the interim results and these interim results shall be logically determined by 'AND' function for the final result. If the final result evaluates to True for a receiver, it shall imply that the associated NRT service or content item is targeted at the receiver.

FIG. 17 is a diagram illustrating the Targeting Criterion Type Codes.

The targeting_criterion_type_code having a value of '0x01' which has a targeting_value_length of 3 bytes shall define the Geographical location as defined in ATSC 65C, using only the low order 3 bytes shown in FIG. 18.

The targeting_criterion_type_code having a value of '0x02' indicates the alphanumeric postal code using the number of bytes appropriate to the region (up to 8).

The targeting_critierion_type_code having a value of '0x03' which has a targeting_value_length of 2 bytes shall define the Demographic category as defined in ATSC 65C, using only the low order 2 bytes shown in FIG. 19.

The targeting_criterion_type_code having values of '0x00', '0x04-0x0F', and '0x10-0x1F' shall be reserved for future use.

FIG. 18 illustrates the Conditional Type Value Format which defines the Geographical location mentioned above.

A dcc_selection_id is a 64-bit number field that when non-zero, enables a Viewer-Direct-Select "persistence" function.

A location_code is a 24-bit unsigned integer field contains state_code, county_subdivision, and county_code sub fields used in identification of a geographic location.

A state_code is an 8-bit unsigned number that is in the range 0 to 99 that represents the affected State, Territory or Offshore (Marine Area). The state_code shall be coded according to State and Territory FIPS number codes according to 47 CFR §11.31(f). The value of 0 shall indicate all states.

A county_subdivision is a 4-bit unsigned integer in the range 0 to 9 that specifies county subdivisions and shall be defined as shown in [Table 2].

TABLE 3

| county_subdivision | Meaning |
| --- | --- |
| 0x0 | All or an unspecified portion of a county |
| 0x1 | Northwest |
| 0x2 | North Central |
| 0x3 | Northeast |
| 0x4 | West Central |
| 0x5 | Central |
| 0x6 | East Central |
| 0x7 | Southwest |
| 0x8 | South Central |

TABLE 3-continued

| county_subdivision | Meaning |
|---|---|
| 0x9 | Southeast |
| 0xA-0xF | [Reserved] |

A county_code is an unsigned number in the range 0 to 999 that identifies a county within a state identified by state_code. The county_code shall be the numeric representation of the "CCC" field in the EAS Protocol as defined in 47 CFR §11.31 (c), which states that county codes use the "State and Territory Federal Information Processing Standard (FIPS) numbers as described by the U.S. Department of Commerce in the National Institute of Standards and Technology publication FIPS PUB 6-4." A value 0 shall indicate the entire state, territory or offshore (marine) area.

FIG. 19 is a diagram illustrating Demographic Selection Type Assignments defining the Demographic Selection mentioned above in FIG. 17.

The values have specific age distribution meaning as shown in FIG. 19. As mentioned above, the Demographic category will use only the low order 2 bytes.

FIG. 20 is a diagram of a bit-stream syntax for the Targeting Criterion Table configured according to an embodiment of the present invention. The Targeting Criterion Table can be used to define a new targeting criterion, giving its type code, the length of its value field. The set of its allowable values, and a text label for each values, thus providing a backwards compatible way to extend the initial set of targeting criteria. Since the targeting_criterion_type_code appears as a subfield of the table_id_extension_field, there may be multiple instances of this table for multiple new targeting criteria.

When an instance of this table is delivered for the benefit of an NRT Virtual Channel in an ATSC fixed broadcast, it shall be delivered in the NRT Service Signaling Channel of the NRT Virtual Channel. When an instance is delivered for the benefit of an NRT service in an ATSC M/H Broadcast, it shall be delivered in the Service Signaling Channel of each ensemble in that M/H Broadcast.

A table_id field is an 8-bit unsigned integer that shall identify the table section as the Targeting Criterion Table Section.

A section_syntax_indicator is a 1-bit field which indicates the section is formatted in MPEG "long-form" syntax.

A private_indicator field (1-bit) shall be set to '1'.

A section_length is an 8-bit field, the first two bits of which shall be '00'. This field specifies the number of bytes of the section. The value in this field shall not exceed 1021.

A table_id_extension is a 16-bit field and is table-dependent. It shall be considered to be logically part of the table_id field providing the scope for the remaining fields.

A TCT_protocol_version is an 8-bit unsigned integer field whose function is to allow, in the future, this targeting_criterion_table_section to carry parameters that may be structured differently than those defined in the current protocol.

A targeting_criterion_type_code is a 5-bit unsigned integer that specifies the type of value contained in the target_value field. The values for target_criterion_type_code shall be defined by the Targeting Criterion Type Codes illustrated in FIG. 17.

A targeting_value_length_minus_1 is a 3-bit unsigned integer field that shall specify the number of byes used for the targeting_value of this entry as mentioned above.

A version_number field (5-bit) represents a version number of the TCT.

A current_next_indicator is a one-bit indicator, which when set to '1' shall indicate that the TCT is currently applicable. When the bit is set to '0', it shall indicate that the table sent is not yet applicable and will be the next table to become valid. This standard imposes no requirement that next tables (those with current_next_indicator set to '0') must be sent. An update to the currently applicable table shall be signaled by incrementing the version_number field.

A section_number field (8-bit) shall give the section number of this TCT section. The section_number of the first section in a TCT shall be '0x00'. The section_number shall be incremented by 1 with each additional section in the TCT.

A last_section_number field (8-bit) shall give the number of the last section (the section with the highest section_number) of the TCT of which this section is a part.

A criterion_type_text_length is an 8-bit field indicating the length (in bytes) of the criterion_type_text.

A criterion_type_text( ) will define the new targeting criteria. For example, the new criteria could define a 'job description' or 'the model of the receiver.' Once the new criteria is defined and stored in the receiver, this criterion will no longer need to be defined later on.

In a fixed receiver, the following will explain the process of handling the Receiver Targeting Descriptor using NRT content filtering.

First, the receiver will parse the IP datagram corresponding to the NRT Service Signaling Channel (SSC) from the IP datagram transmitted through DSM-CC section. The NRT SSC has a well-known IP address and UDP port number and using this well-known IP address and UDP port number, the corresponding packet is received.

Next, the receiver will check the NST signaling information or NRT-IT announcement information transmitted through NRT SSC. The receiver will then parse the Receiver Targeting Descriptor in the content level of NRT-IT or in the service level of NST.

According to the Receiver Targeting Descriptor, the receiver will check whether the NRT service or the NRT content is conforming to the target location or the target age group defined by the receiver. The receiver will already have the necessary information such as the location and the age of the subscriber.

When the receiver conforms that the target location and the target age group is adequate for the transmitted service or the content, the service or the content will be downloaded.

The process of updating new Criterion Type and Criterion Value according to an embodiment of the present invention will now be explained.

The receiver will check whether the Targeting Criterion Type transmitted through NST, NRT-IT, SMT (mobile), or OMA BCAST SG (mobile) has already been defined before. In other words, the receiver will check to see if the type is outside the value of 0x01 to 0x03. If the type is outside the value, then the receiver will store the corresponding Targeting Criterion Table.

Next, the section data corresponding to the Targeting Criterion Table defining the Targeting Criterion Type will be transmitted. The targeting_criterion_type_code from the table_id_extension field of the section data is used to find the section data defined by the Targeting Criterion Type.

The receiver will update the Targeting Criterion information by receiving the section data corresponding to the Targeting Criterion Type and the targeting_criterion_type_code.

The receiver will then display the criterion_type_text information to the user so that the user will know what the updated Criterion information is.

The user will newly set the receiver using the new criterion_type_text and its value. The receiver can request the user to input the value by giving value choices so that the user just has to input the corresponding number. For example, if the new Criterion Type is "job description," the receiver can give the user choices such as researcher, attorney, doctor, etc. and request the user to input a number corresponding to the value.

In an another embodiment, it is possible to download all Targeting Criterion Type and then when an unknown Criterion type is received, the definition can be looked-up from the pre-stored type in the Targeting Criterion Type. This process can be done achieved through different channels that are received as well. So, the NRT content item received from different channels can also be filtered and be updated. Therefore, it is possible to set a standard for NRT content filtering by requesting to the user to input the value depending upon the new Criterion.

Figure 21:
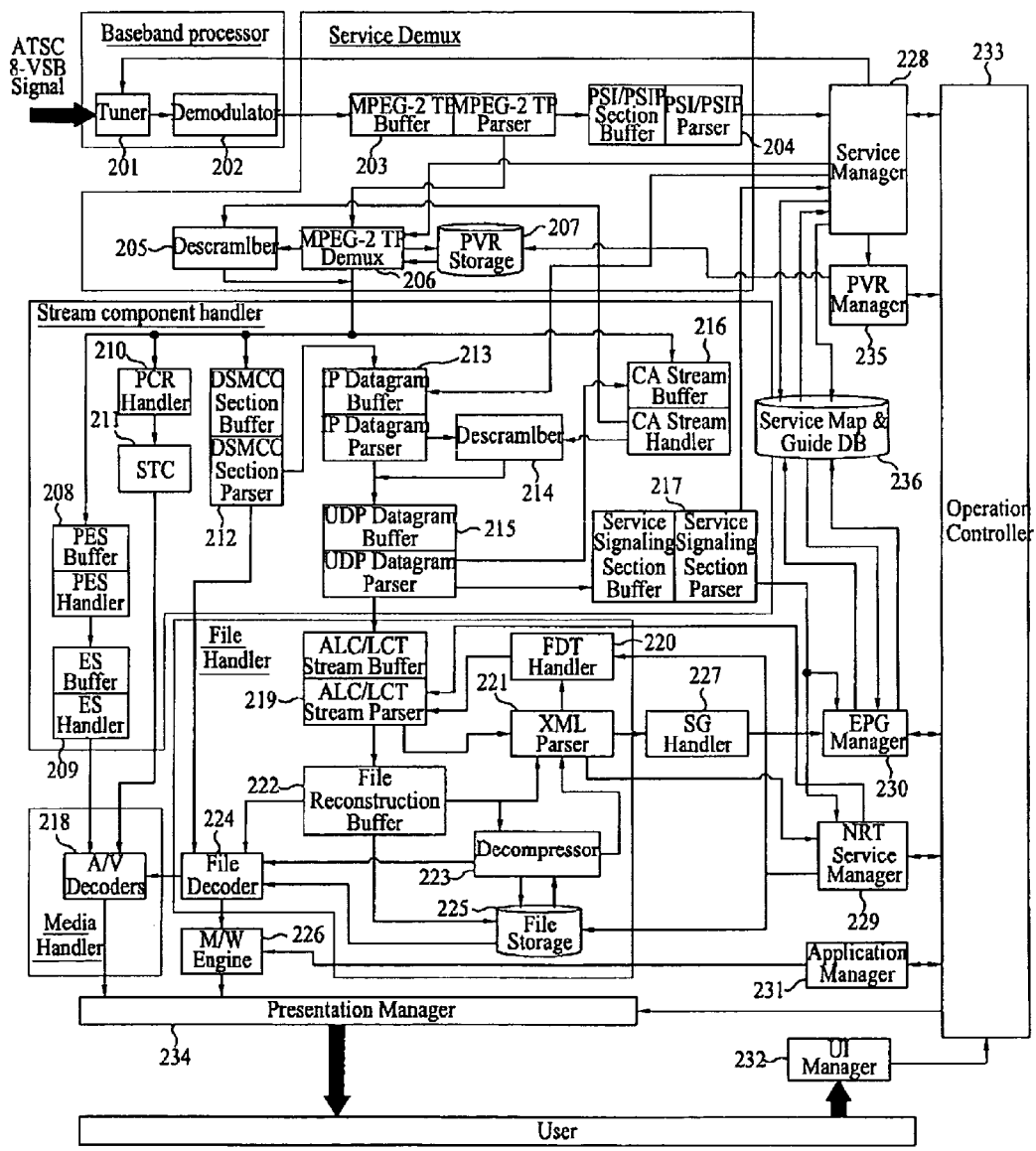
FIG. 21 is a block diagram of a fixed NRT service receiving system according to an embodiment of the present invention.

FIG. 21 is a block diagram of a fixed NRT service receiving system according to an embodiment of the present invention.

Referring to FIG. 21, the receiving system mainly includes a baseband processor, an MPEG-2 service demultiplexer (demux), a stream component handler, a media handler, a file handler, and other parts. The units of the receiving system shown in FIG. 2 are explained in the following.

First of all, the baseband processor includes a tuner 201 and a vestigial side band (VSB) demodulator 202. The tuner 201 detects VSB radio frequency (RF) signal transmitted over the air and then extracts a symbol from the detected VSB RF signal. In this case, the tuner 201 is controlled by a service manager 228. The VSB demodulator 202 reconstructs meaningful data by demodulating the VSB symbol extracted by the tuner 201.

The MPEG-2 service demultiplexer includes an MPEG-2 TP buffer/parser 203, a program specific information/program and system information protocol (PSI/PSIP) section/buffer 204, a descrambler 205, an MPEG-2 TP demultiplexer (demux) 206 and a personal video recorder (PVR) storage 207.

The MPEG-2 FP buffer/parser 203 buffers and reconstructs the MPEG-2 TP carried on a VSB signal and then detects and processes a TP header.

The PSI/PSIP section/buffer 204 buffers and parses PSI/PSIP section data carried on an MPEG-2 TS. In this case, the parsed PSI/PSIP data is collected by the service manager 228 and is then stored as a service map and guide data in a database.

The descrambler 205 reconstructs data of a payload for a scrambled packet payload in the MPEG-2 TP, using an encryption key or the like, delivered from a conditional access (CA) stream handler 216.

The MPEG-2 TP demultiplexer 206 filters an MPEG-2 TP varied on a VSB signal or a TP depending on the receiver that is to process among the MPEG-2 TP stored in the PVR storage 207 and then relays the filtered TP to a proper processing module. In this case, the MPEG-2 TP demultiplexer 206 can be controlled by the service manager 228 and the PVR manager 235.

The PVR storage 207 stores the received MPEG-2 TP using the VSB signal when requested by the end-user and outputs the MPEG-2 TP when requested by the end-user. In this case, the PVR storage 207 can be controlled by the PVR manager 235.

The stream component handler includes a packetized elementary stream (PES) buffer/handler 208, an elementary stream (ES) buffer/handler 209, a program clock reference (PCR) handler 210, a system time clock (STC) unit 211, a digital storage media command and control (DSM-CC) section buffer/handler 212 which receives the NRT Service Table (NST), an IP datagram buffer/header parser 213, an end-user datagram protocol (UDP) datagram buffer/handler 215, a CA stream buffer/handler 216 and a service signaling section buffer/handler 217. The DSM-CC section buffer/handler 212 will parse the IP datagram corresponding to the NRT Service Signaling Channel (SSC). Since the NRT SSC is transmitted through a well-known IP address and UDP port number, the packet is received through the IP/UDP information.

The PES buffer/handler 208 buffers and reconstructs a PES carried on an MPEG-2 TS.

The ES buffer/handler 209 buffers and reconstructs an ES such as audio data, video data or the like, which is transmitted as a PES, and then delivers the reconstructed ES to a proper A/V decoder 218.

The PCR handler 210 handles PCR data used for time synchronization of audio and video streams or the like.

The STC unit 211 corrects a clock value of the A/V decoder 218 using a reference clock value delivered via the PCR handler 210 to enable time synchronization.

The DSM-CC section buffer/handler 212 buffers and handles DSM-CC section data for a file transmission via the MPEG-2 TP and an IP datagram encapsulation. An actual IP level transmission is carried out in a well-known IP address, such that the receiver can receive an IP level without separately acquiring IP connection information.

The IP datagram buffer/header parser 213 buffers and reconstructs an IP datagram, which is encapsulated via DSM-CC addressable section and is then carried on an MPEG-2 TP. The IP datagram buffer/header parser 213 parses a header of each IP datagram through the reconstruction. In this case, the IP datagram buffer/header parser 213 is controlled by the service manager 228. The IP datagram buffer 213, the UDP datagram buffer 215, and the service signaling section parser 217 receives and processes the NRT Information Table (NRT-IT) from the ATSC 8-VSB signal. The Service Signaling Section Parser 217 will parse the Receiver Targeting Descriptor included in the content level of the NRT-IT or the service level of the NST. The Targeting Criterion Table will also be parsed by the service signaling section parser 217.

If scrambling is applied to a payload in the received IP datagram, the descrambler 214 reconstructs data of the payload using an encryption key for the payload delivered from the CA stream handler 216.

The UDP datagram buffer/handler 215 buffers and reconstructs a UDP datagram carried on an IP datagram and also parses and processes a UDP header.

The CA stream buffer/handler 216 buffers and handles such data as a key value for descrambling, for example, an entitlement management message (EMM) transmitted for a conditional access function carried on an MPEG-2 TS or an IP stream, an entitlement control message (ECM). In this case, an output of the CA stream buffer/handler 216 is delivered to the descrambler 214 to perform a decryption operation of an MPEG-2 TP or an IP datagram that carries AV data, file data and the like.

The service signaling section buffer/parser 217 processes an NRT Service Table (NST), an NRT Information Table (NRT-IT) and descriptors related to the NST or the NRT-IT for signaling an NRT service of the present invention. The processed signaling information is transferred to the NRT service manager 229.

The media handler includes A/V decoders 218.

The AV decoders 218 decode compressions of audio and video data delivered via the ES handler 209 and then processes the decoded data, which are to be presented to an end-user.

The file handler includes an Asynchronous Layered Coding/Layered Coding Transport (ALC/CLT) buffer/parser 219, a file description table (FDT) handler 220, an extensible markup language (XML) parser 221, a file reconstruction buffer 222 and a decompressor 223.

The ALC/LCT buffer/parser 219 buffers and reconstructs ALC/LCT data carried on UDP/IP stream and then parses a header of ALC/LCT and a header extension thereof. In this case, the ALC/LCT buffer/parser 219 can be controlled by the NRT service manager 229.

The FDT handler 220 parses and processes a FDT of a File Delivery over Unidirectional Transport (FLUTE) protocol transmitted via an ALC/LCT session. It is able to transfer the processed FDT to the NRT service manager 229. The FDT handler 220 can also be controlled by the NRT service manager 229.

The XML parser 221 parses an XML document transmitted via the ALC/LCT session and then delivers the parsed data to such a proper module as the FDT handler 220, the SG handler 227 and the like.

The file reconstruction buffer 222 reconstructs a file transferred to the ALC/LCT and FLUTE session.

If the file transferred to the ALC/LCT and FLUTE session is compressed, the decompressor 223 performs a process for decompressing the compression.

The file decoder 224 decodes a file reconstructed by the file reconstruction buffer, a file decompressed by the decompressor 223, or a file extracted from the file storage 225.

The file storage 225 stores and extracts the received file. In this case, the received file may contain NRT content.

Finally, the remaining parts, not explained above, will be explained as follows.

A middleware (M/W) engine 226 processes data of a file that is not an AV stream transferred via a DSM-CC section or an IP diagram, and then delivers the processed data to the presentation manager 234.

The SG handler 227 collects and parses service guide data transferred in an XML document format and then delivers the parsed data to the EPG manager 230.

The service manager 228 produces a service map by collecting and parsing the PSI/PSIP data carried on MPEG-2 TS and service signaling section data carried on an IP stream and then controls an access to a service specified by an end-user by storing the service map in a service map & guide database. In this case, the service manager 228 is controlled by an operation controller 230 and then controls the tuner 201, the MPEG-2 TP demultiplexer 206, the IP datagram buffer/handler 213, and the NRT service manager 229. The Service Manager 228 will determine whether the NRT service or the NRT content is adequate for the receiver to download the NRT service or the NRT content by matching the target location and/or the target age group defined by the Receiver Targeting Descriptor with the pre-stored information in the receiver. If it is determined that downloading is adequate, the Service Manager will download the corresponding NRT service or content processed and stored.

The NRT service manager 229 performs overall managements on the NRT service transferred in an object/file format via FLUTE session on an IP layer. The NRT service manager 229 parses the signaling information transferred from the service signaling section buffer/parser 217. And, the parsed signaling information is transferred to the service map & guide database 236 to be stored therein. Moreover, the NRT_service manager 229 controls NRT-IT information, which correspond to contents related to a service guide in the signaling information, to be transferred to the EPG manager 230, thereby forming EPG data. In this case, the NRT service manager 229 controls the FDT handler 220, the file storage 225 and the like. Therefore, the NRT service manager 229 receives the FDT from the FDT handler 220, parses the received FDT and then controls received NRT contents to be stored as a hierarchical structure in the file storage 225. And, the NRT service manager 229 controls the corresponding NRT contents to be extracted from the file storage 225 in case that a user makes a selection for the NRT service. The service map & guide database 236 may further store information containing future download time and contents, including files associated with the contents, inputted by the end-user through UI Manager 232. Following such an input from the end-user, when the download time has been reached, the service map & guide database will start downloading the contents through operation controller 233, EPG manager and stores the content.

The EPG manager 230 receives the service guide data from the SG handler 227, configures EPG data, and then controls the EPG data to be displayed. The EPG manager 230 will configure the service guide information and UI manager 232 will display the NRT service guide to end-user based on the defined NRT-IT fields. Therefore, the title, available time for download, and the estimated download time are displayed so the end-user can choose the content or the files associated with the content that the end-user wishes to download.

The application manager 231 performs overall managements on processing of application data transferred in such a format as an object, a file and the like.

The user interface (UI) manager 232 delivers an input of a user via a UI to the operation controller 233 and enables an operation of a process for a user-requested service to be initiated. The user interface (UI) manager 232 may request to the user to input the target criterion text and values in order to newly set the receiver.

The operation controller 233 processes a user's command delivered via the UI manager 232 and then enables a manager of a necessary module to perform a corresponding action.

And, the presentation manager 234 provides at least one of A/V data outputted from the A/V decoder 218, file data outputted the middleware (M/W) engine 226 and EPG data outputted from the EPG manager 230 to user via speaker and/or screen.

FIG. 22 is a XML Schema Definition for Receiver Targeting Type (RcvrTargetingType) according to an embodiment of the present invention and FIG. 23 is a XML Schema Diagram for RcvrTargetingType according to the present invention.

In an ATSC mobile broadcast, an RcvrTargeting XML element may go in the PrivateExt element of a Service fragment, and it may go in the PrivateExt element of a Content fragment as shown in FIG. 24. In the former case it shall apply to all content items of the service represented by the Service fragment. In the latter case it shall apply to the individual content item represented by the Content fragment. More formally, the following element shall be added to the PrivateExt element in the XML schemas for the Content and Service fragments: <element name="RevrTargeting" type="RevrTargeting" minOccurs="0"/> And FIGS. 23 and 24 illustrates another version of the XML schema according to an embodiment of the present invention.

Figure 25:
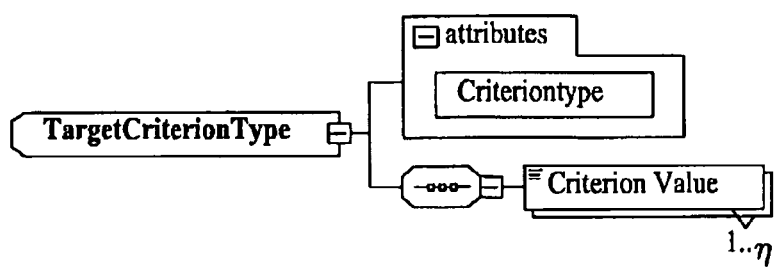
FIG. 25 is a XML Schema Diagram for Receiver Targeting Type according to an embodiment of the present invention.
Figure 26:
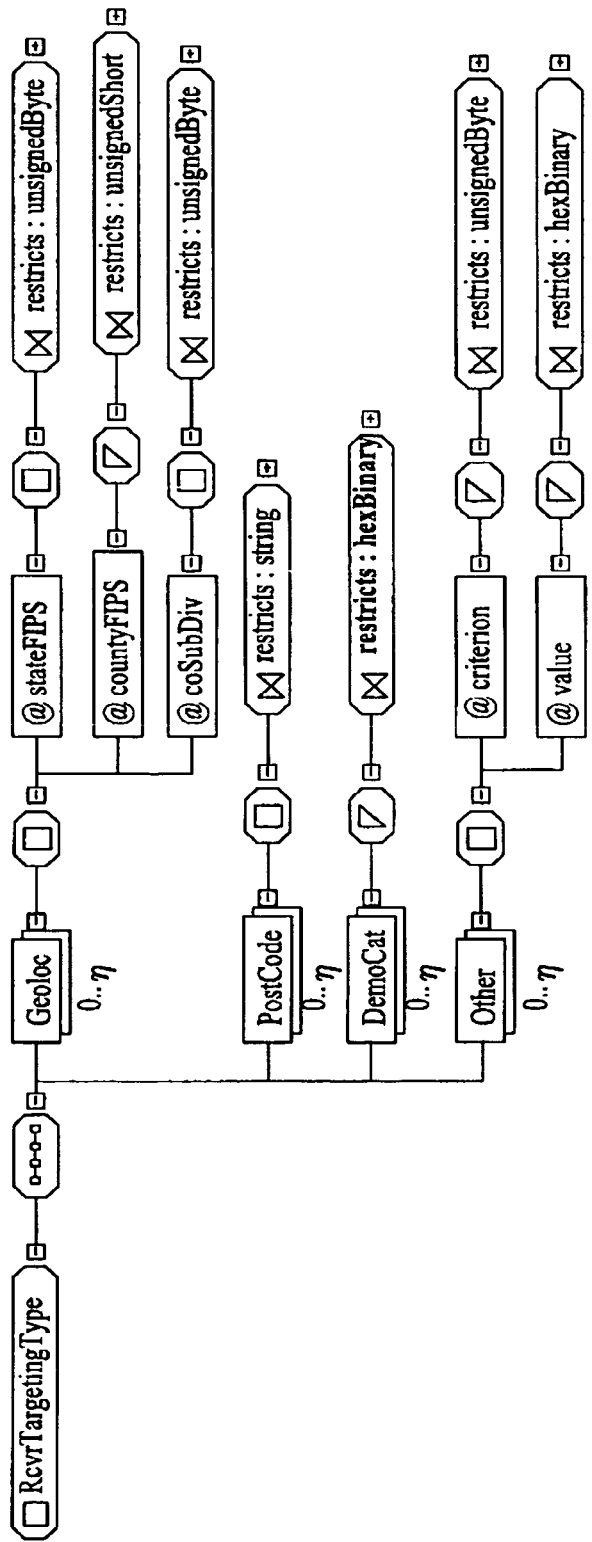
FIG. 26 is a XML Schema Diagram for Receiver Targeting Type according to another embodiment of the present invention.
Figure 28:
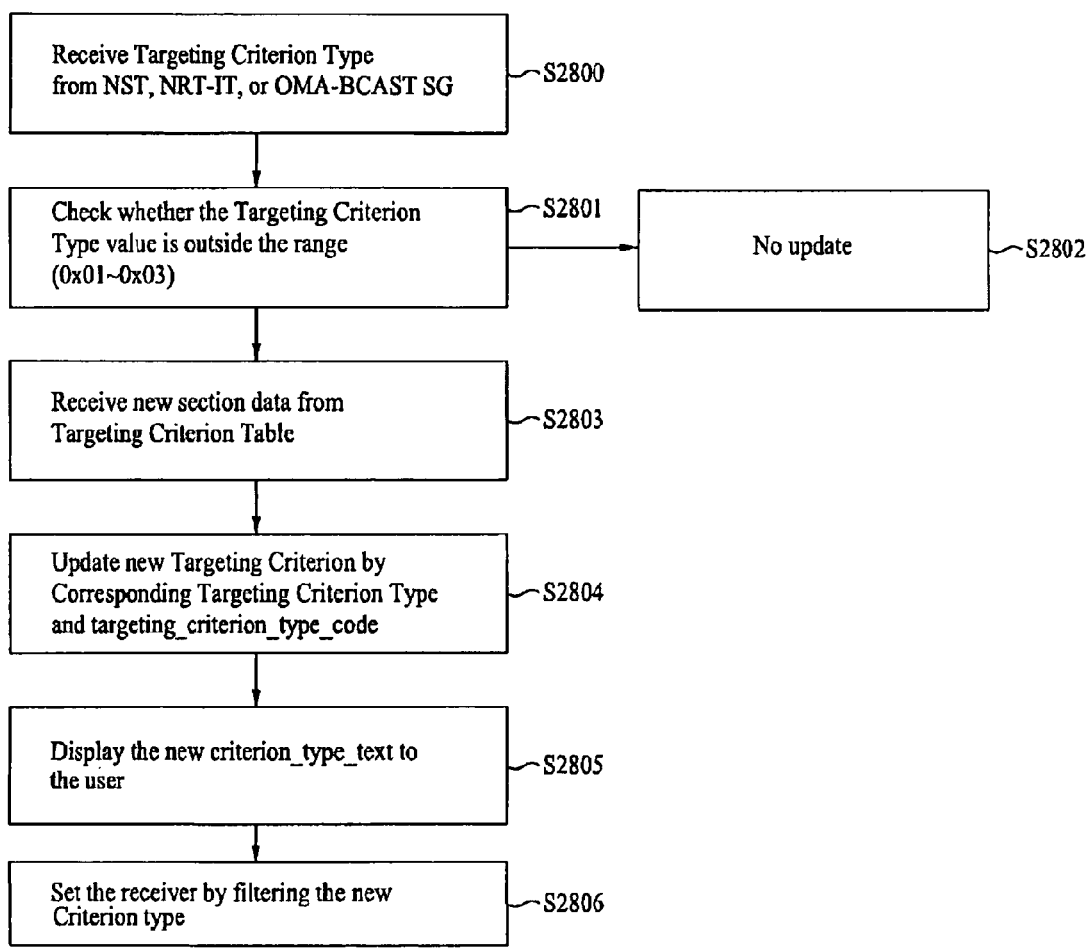
FIG. 28 is a flowchart illustrating the process of NRT content filtering using the Receiver Targeting Descriptor according to an embodiment of the present invention.

FIG. 25 is a XML Schema Diagram for RcvrTargetingType illustrated in FIG. 22 and FIG. 26 is another XML Schema Diagram for RcvrTargetingType illustrated in FIGS. 23 and 24.

The semantics of the stateFIPS, countyFIPS and coSubDiv attributes shall be the same as the state_code, county_code and county_subdivision fields in Table 6.21 of A/65C. The semantics of the PostCodeelement shall be the same as that of the alphanumeric postal code defined in section 6.7.2 of A/65C. The semantics of the DemoCat element shall be the same as that of the low order 2 bytes of the Demographic Category number defined in Table 6.18 of A/65C. The semantics of the "Other" element are that the "criterion" attribute shall match the targeting_criterion_type_code of an instance of the Targeting Criterion Table, defined in section 6.4 of this standard, and the "value" attribute shall match a value_code field in that table instance.

It is expected that more precise semantics of the criterion and values will be provided by any future version of this standard that defines an instance of the Targeting Criterion Table, and that for the benefit of legacy receivers the text descriptions of the criterion and values in the Table will be reasonably self-explanatory.

If number of immediate sub-elements of a RcvrTargeting element is greater than one, each of these shall be evaluated as an individual term, returning "true" if the targeting values in the sub-element matches a value for the receiver/viewer property corresponding to that sub-element, and returning "false" otherwise. Among these intermediate terms, all instances of the same-subelement shall be logically ORed to obtain the interim result for each targeting criterion and these interim results shall be logically ANDed together to determine the final result. If the final result evaluates to True for a receiver, it shall imply that the associated NRT service or content item is targeted at that receiver.

FIG. 27 is a syntax structure of a Content fragment of Open Mobile Alliance (OMA) Mobile Broadcast Services Enabler Suite (BCAST) Service Guide (SG) according to an embodiment of the present invention.

As explained above, an RcvrTargeting XML element may go in the PrivateExt element in the content fragment of OMA BCAST. As shown in FIG. 27 under the PrivateExt, "Receiver Targeting" element is included in the SG content fragment.

Finally, FIG. 26 illustrates a flowchart of updating the new Criterion Type and Criterion Value configured according to an embodiment of the present invention.

First, the receiver checks whether the Targeting Criterion Type received through NST, NRT-IT, SMT (Mobile), or OMA-BCAST SG is outside the normal range of 0x01 to 0x03. If the Targeting Criterion Type is outside the range, it will store the new Targeting Criterion Type and Value.

For storing the new Targeting Criterion Type and Value, the receiver will receive the section data corresponding to the Targeting Criterion Table defining the Targeting Criterion Type. This is done by using the targeting_criterion_type_code in the table_id_extension field of the section data.

The receiver will update the new Targeting Criterion information by accessing the section data that corresponds with Targeting Criterion Type value and the targeting_criterion_type_code.

The receiver will then display to the user the new Criterion with the criterion_type_text information.

The user will then set the receiver accordingly by filtering the Criterion through the text corresponding to the criterion_type_text and its values.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting a broadcast signal for a Non-Real Time (NRT) service, the method comprising:
   generating the broadcast signal including the NRT service that is delivered in advance of its use and stored in a receiving device, and signaling data including an NRT Information Table (NRT-IT) describing one or more content items available for download to storage in the receiving device for signaling NRT service and signaling data further including a Service Map Table (SMT) containing service-level attributes for the NRT broadcasting, wherein the SMT includes information used as a linkage to the NRT-IT; and
   transmitting the NRT service via a broadcast channel and the signaling data via a Service Signaling Channel (SSC) with a specific IP address and UDP port number, wherein:
   the NRT service is delivered within IP packets forming an IP subnet, the IP subnet associated with a virtual channel are identified by references in a Virtual Channel Table (VCT) and an associated Program Map Table (PMT),
   the IP packets are carried in MPEG-2 Transport Stream using Digital Storage Media Command and Control (DSM-CC) Addressable Section format,
   a Receiver Targeting Descriptor is included in at least one of SMT and NRT-IT,
   the NRT service is downloaded based on targeting_criterion_type_code included in the Receiver Targeting Descriptor, and
   the PMT includes information indicating that the SSC is contained in a program element included in the IP subnet.

2. The method of claim 1, wherein the Receiving Targeting Descriptor provides one or more targeting criterion values to indicate the receiving device to which the content item is targeted.

3. The method of claim 2, wherein the Receiving Targeting Descriptor included in the SMT is overridden for individual content items by Receiving Targeting Descriptor included in the NRT-IT.

4. The method of claim 3, wherein the Receiving Targeting Descriptor includes information indicating the number of targeting entries, each of entries having the targeting_criterion_type_code, a targeting_value_length, and a targeting_value.

5. The method of claim 4, wherein the targeting_criterion_type_code included in the Receiving Targeting Descriptor indicates any one of geographical location, alphanumeric postal code, and demographic category.

6. An apparatus for receiving a broadcast signal for a Non-Real Time (NRT) service, the apparatus comprising:
   a first receiving unit configured to receive the broadcast signal including the NRT service that is delivered in advance of its use and stored in a receiving device, and signaling data including an NRT Information Table (NRT-IT) describing one or more content items available for download to storage in the receiving device for signaling NRT service and signaling data further including a Service Map Table (SMT) containing service-level attributes for the NRT broadcasting, wherein the SMT includes information used as a linkage to the NRT-IT; and
   a second receiving unit configured to receive the NRT service via a broadcast channel and the signaling data via a Service Signaling Channel (SSC) with a specific IP address and UDP port number, wherein:

the NRT service is delivered within IP packets forming an IP subnet, the IP subnet associated with a virtual channel are identified by references in a Virtual Channel Table (VCT) and an associated Program Map Table (PMT), the IP packets are carried in MPEG-2 Transport Stream using Digital Storage Media Command and Control (DSM-CC) Addressable Section format, a Receiver Targeting Descriptor is included in at least one of SMT and NRT-IT, the NRT service is downloaded based on targeting_criterion_type_code included in the Receiver Targeting Descriptor, and the PMT includes information indicating that the SSC is contained in a program element included in the IP subnet.

7. The apparatus of claim 6, wherein the Receiving Targeting Descriptor provides one or more targeting criterion values to indicate the receiving device to which the content item is targeted.

8. The apparatus of claim 7, wherein the Receiving Targeting Descriptor included in the SMT is overridden for individual content items by Receiving Targeting Descriptor included in the NRT-IT.

9. The apparatus of claim 8, wherein the Receiving Targeting Descriptor includes information indicating the number of targeting entries, each of entries having the targeting_criterion_type_code, a targeting_value_length, and a targeting_value.

10. The apparatus of claim 9, wherein the targeting_criterion_type_code included in the Receiving Targeting Descriptor indicates any one of geographical location, alphanumeric postal code, and demographic category.

* * * * *